(12) United States Patent
Kishi et al.

(10) Patent No.: US 11,366,848 B2
(45) Date of Patent: Jun. 21, 2022

(54) INFORMATION PROCESSING SYSTEM, INFORMATION PROCESSING METHOD, AND OPERATOR TERMINAL

(71) Applicant: Ricoh Company, Ltd., Tokyo (JP)

(72) Inventors: Hidenobu Kishi, Kanagawa (JP); Junko Nakano, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 243 days.

(21) Appl. No.: 16/038,629

(22) Filed: Jul. 18, 2018

(65) Prior Publication Data
US 2019/0026272 A1 Jan. 24, 2019

(30) Foreign Application Priority Data

Jul. 21, 2017 (JP) .............................. JP2017-142165

(51) Int. Cl.
*G06F 16/51* (2019.01)
*G06T 19/00* (2011.01)
(Continued)

(52) U.S. Cl.
CPC .............. *G06F 16/51* (2019.01); *G06F 16/00* (2019.01); *G06F 16/583* (2019.01);
(Continued)

(58) Field of Classification Search
None
See application file for complete search history.

(56) References Cited

U.S. PATENT DOCUMENTS

| | | | |
|---|---|---|---|
| 8,814,691 B2* | 8/2014 | Haddick | G02B 27/0172 463/42 |
| 2010/0008265 A1* | 1/2010 | Freer | H04L 67/04 370/259 |

(Continued)

FOREIGN PATENT DOCUMENTS

| | | |
|---|---|---|
| JP | 2009-225268 | 10/2009 |
| JP | 2015-18405 A | 1/2015 |
| WO | WO 2015/022791 A1 | 2/2015 |

OTHER PUBLICATIONS

Layar.com, "GetPOIs Request—Layar Developer Documentation", Sep. 12, 2015, available from <https://web.archive.org/web/20150912022738/https://www.layar.com/documentation/browser/api/getpois-request/> (Year: 2015).*

(Continued)

*Primary Examiner* — Polina G Peach
*Assistant Examiner* — Anugeetha Kunjithapatham
(74) *Attorney, Agent, or Firm* — Xsensus LLP

(57) ABSTRACT

An information processing system includes an operator terminal to transmit a captured image, and an image searching system connected with the operator terminal. The image searching system includes a first memory to store a registration image of a registration object and associated attachment information, and first circuitry configured to receive the captured image from the operator terminal, search the attachment information based the captured image, and transmit the attachment information. The operator terminal includes second circuitry to transmit the captured image to the image searching system, receive the attachment information from the image searching system, acquire a specific content from a storage location on a network in accordance with the received attachment information, execute a first application to perform a specific operation using the specific content, and execute a second application to call the first (Continued)

application when the received attachment information includes a text string designating the specific operation.

12 Claims, 28 Drawing Sheets

(51) Int. Cl.
*G06F 16/583* (2019.01)
*G06F 16/00* (2019.01)
*G06Q 30/02* (2012.01)
*G06Q 50/00* (2012.01)
*H04N 1/00* (2006.01)
*H04L 67/02* (2022.01)

(52) U.S. Cl.
CPC ......... *G06Q 30/0201* (2013.01); *G06Q 50/01* (2013.01); *G06T 19/006* (2013.01); *H04N 1/00* (2013.01); *H04L 67/02* (2013.01)

(56) References Cited

U.S. PATENT DOCUMENTS

| | | | | |
|---|---|---|---|---|
| 2011/0255736 A1* | 10/2011 | Thompson | ............. | G06Q 50/01 382/100 |
| 2013/0063487 A1* | 3/2013 | Spiegel | ................. | G06Q 30/02 345/633 |
| 2013/0281207 A1* | 10/2013 | Lyons | ................. | G07F 17/3206 463/33 |
| 2014/0019264 A1* | 1/2014 | Wachman | .......... | G06Q 30/0276 705/14.72 |
| 2014/0171039 A1* | 6/2014 | Bjontegard | ........... | A63F 13/217 455/414.1 |
| 2016/0203645 A1* | 7/2016 | Knepp | ................... | G06Q 10/00 345/633 |
| 2016/0292926 A1* | 10/2016 | Rosenthal | .......... | G06K 9/00677 |

OTHER PUBLICATIONS

Layar Developer Documentation, "Layar Platform Overview", Sep. 12, 2015, accessible from <https://web.archive.org/web/20150912022558/https://www.layar.com/documentation/browser/layar-platform-overview/> (Year: 2015).*

Layar Developer Documentation, "Layar GetPOIs Response", Sep. 12, 2015, accessible from <https://web.archive.org/web/20150912021954/https://www.layar.com/documentation/browser/api/getpois-response> (Year: 2015).*

Layar Developer Documentation, "Layar Actions", Sep. 12, 2015, accessible from <https://web.archive.org/web/20150912040901/https://www.layar.com/documentation/browser/api/getpois-response/actions/> (Year: 2015).*

McPherson et. al., "No Escape From Reality: Security and Privacy of Augmented Reality Browsers", May 2015 (Year: 2015).*

Office Action dated Dec. 8, 2020 in corresponding Japanese Patent Application No. 2017-142165, 2 pages.

* cited by examiner

FIG. 11

×× QUESTIONNAIRE

GENDER  MALE ● FEMALE ○

AGE  -20 ● 21-30 ○ 31-40 ○ 41-50 ○ 51- ○   — 4101

Q1: ARE YOU XXX?  ● ○

Q2: CHECK INTERESTED ITEMS (ONE OR MORE)

MUSIC ☑  PAINTING ☐  SPORTS ☑  IT ☐  QUALIFICATION ☐

CINEMA ☐  DRAMA PLAY ☐  CARTOON ☑  NOVEL ☐  ESSAY ☐

OK — 4102

4100 http://www.example.com/user/index.html clicker-ar://image?url=<image url> clicker-ar://image?url=http://www.example.com/frames/jp-aaa.png

FIG. 28

`<META HTTP-EQUIV="Refresh" CONTENT="0; URL=clicker-ar://image?url=http://www.example.com/frames/jp-aaa.png/">`

INFORMATION PROCESSING SYSTEM, INFORMATION PROCESSING METHOD, AND OPERATOR TERMINAL

CROSS-REFERENCE TO RELATED APPLICATION

This application claims priority pursuant to 35 U.S.C. § 119(a) to Japanese Patent Application No. 2017-142165, filed on Jul. 21, 2017, in the Japan Patent Office, the disclosure of which is incorporated by reference herein in its entirety.

BACKGROUND

Technical Field

This disclosure relates to an information processing system, an information processing method, and an operator terminal.

Background Art

Image searching systems are configured to store image information associated with attachment information in a memory, receive a search request including an image captured by a camera from an apparatus, search the image information in the memory in response to the search request, and transmit the attachment information associated with the searched image information to the apparatus that has requested the search request. The attachment information includes, for example, information indicating a communication partner (e.g., server) of the apparatus. The apparatus that has requested the search request can access the communication partner based on the attachment information and acquire contents from the communication partner.

One conventional art discloses a technique in which an image, attachment information and first identification information are associated with each other and registered in a communication partner apparatus, and an image searching is performed at the communication partner apparatus in response to receiving a captured image from a terminal device, and then terminal device can acquire the attachment information and the first identification information from the communication partner apparatus. In this configuration, the communication partner apparatus is registered with the first identification information and second identification information set for each medium by associating the first identification information and the second identification information, and when the terminal device has accessed the communication partner apparatus, a specific content can be provided to the terminal device based on the first identification information and the second identification information.

In this configuration, the specific content can be provided based on the captured image, but it is difficult to implement further enhanced information service based on the specific content.

SUMMARY

In one aspect of the present invention, an information processing system is devised. The information processing system includes an operator terminal configured to transmit an image, captured by an image capture device, as a captured image, and an image searching system connected with the operator terminal via a network. The image searching system includes a first memory configured to store a registration image of a registration object and attachment information associated with the registration image, and first circuitry configured to receive the captured image from the operator terminal, search the attachment information associated with the registration image of the registration object based on an image of an object detected in the captured image, and transmit the attachment information to the operator terminal. The operator terminal includes second circuitry configured to acquire the captured image captured by the image capture device, transmit the acquired captured image to the image searching system, receive the attachment information from the image searching system as a response of transmitting the captured image to the image searching system, acquire a specific content from a storage location on the network in accordance with the received attachment information, execute a first application to perform a specific operation using the specific content acquired from the storage location on the network, and execute a second application to call the first application when the received attachment information includes a text string designating the specific operation.

In another aspect of the present invention, a method of processing information using an operator terminal is devised. The method includes acquiring an image, captured using an image capture device, as a captured image at the operator terminal, transmitting the captured image to an image searching system connected with the operator terminal via a network, the image searching system, including a memory storing a registration image of a registration object and attachment information associated with the registration image, configured to search the attachment information corresponding to an image of an object detected in the captured image from the memory and to transmit the searched attachment information to the operator terminal, receiving the attachment information from the image searching system as a response of transmitting the captured image to the image searching system, acquiring a specific content from a storage location on the network in accordance with the received attachment information, executing a first application to perform a specific operation using the specific content acquired from the storage location on the network, and executing a second application to call the first application when the received attachment information includes a text string designating the specific operation.

In another aspect of the present invention, an operator terminal is devised. The operator terminal includes circuitry configured to acquire an image, captured using an image capture device, as a captured image, transmit the captured image to an image searching system connected with the operator terminal via a network, the image searching system, including a memory storing a registration image of a registration object and attachment information associated with the registration image, configured to search the attachment information corresponding to an image of an object detected in the captured image from the memory and to transmit the searched attachment information to the operator terminal, receive the attachment information from the image searching system as a response of transmitting the captured image to the image searching system, acquiring a specific content from a storage location on the network in accordance with the received attachment information, executing a first application to perform a specific operation using the specific content acquired from the storage location on the network in accordance with the received attachment information, and executing a second application to call the first application when the received attachment information includes a text string designating the specific operation.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 11 illustrates an example of a questionnaire input screen generated by an external service web site;

FIG. 28 illustrates an example of a meta tag used in the first variant example of the first embodiment;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of an information processing system, an information processing method, an information processing program, and an operator terminal of one or more embodiments with reference to the accompanying drawings.

Figure 1:
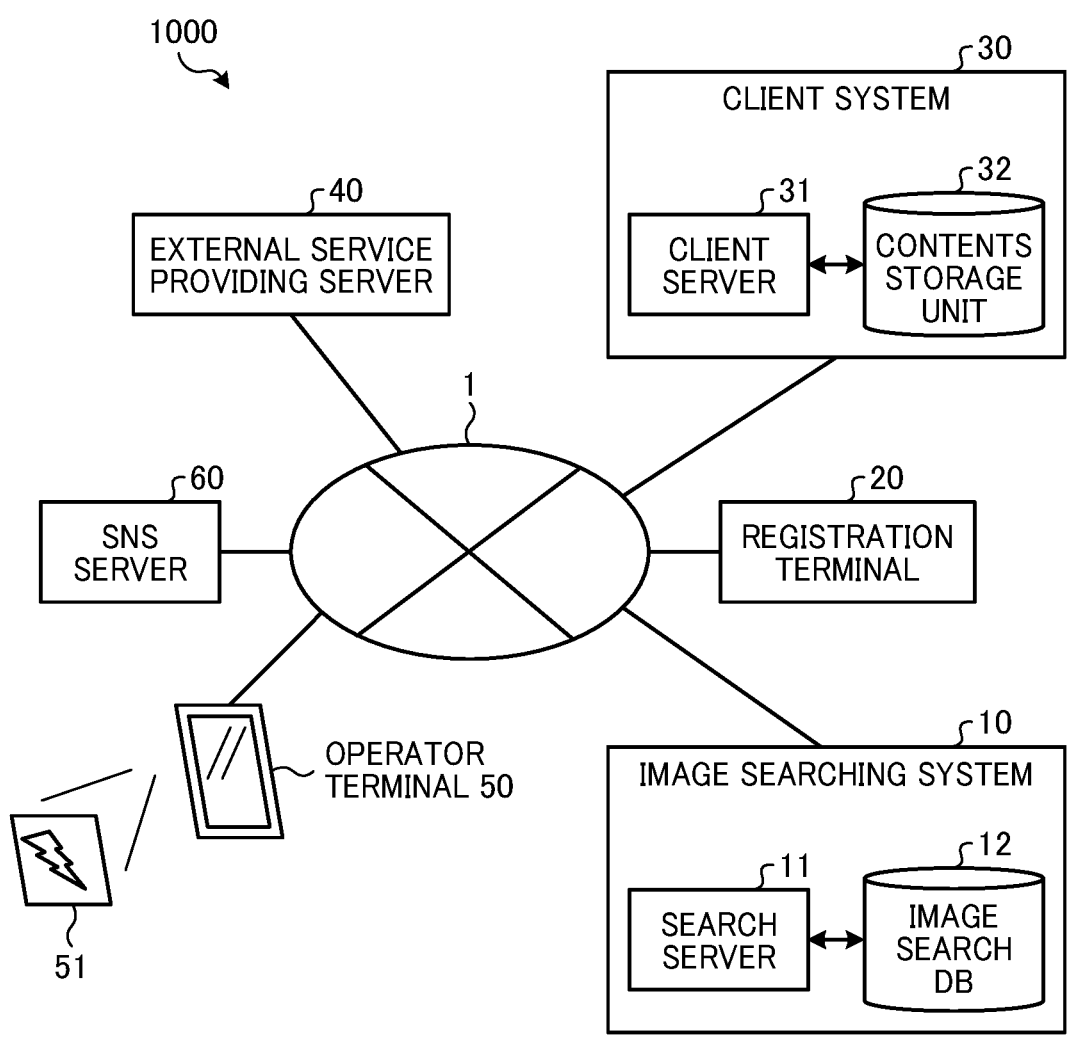
FIG. 1 illustrates a schematic configuration of an information processing system applicable to each embodiment.

FIG. 1 illustrates a schematic configuration of an information processing system 1000 of an embodiment. In an example case illustrated in FIG. 1, the information processing system 1000 includes, for example, an image searching system 10, a registration terminal 20, a client system 30, an external service providing server 40, an operator terminal 50, and a social networking service (SNS) server 60, which are connected to a network 1 such as the Internet wirelessly and/or by wire. The information processing system 1000 can be configured using, for example, at least the image searching system 10, the registration terminal 20, and the operator terminal 50, and the information processing system 1000 may further include the client system 30. The image searching system 10 may be also referred to as the image retrieving system 10.

When the image searching system 10 receives an image from, for example, an apparatus (e.g., operator terminal 50) via the network 1, the image searching system 10 performs image searching based on the received image, and acquires attachment information attached to the image as a result of image searching. Then, the image searching system 10 returns the attachment information acquired as the result of image searching to the apparatus (e.g., operator terminal 50) that has transmitted the image to the image searching system 10. The apparatus (e.g., operator terminal 50) is used as a source of transmitting the image (hereinafter, transmission source).

Specifically, the image searching system 10 includes, for example, a search server 11, and an image search database (DB) 12 as illustrated in FIG. 1. The image search DB 12 is a storage that stores a plurality of index information, used for searching a plurality of images, associated with respective attachment information. In this description, it is assumed that the image search DB 12 stores information (e.g., image) of one or more registered objects (hereinafter, registration object), and the information (e.g., image) of each registration object can be searched using the index information. The index information can be obtained by, for example, analyzing binary of image data, in which the index information is obtained by converting the image data into a data structure suitable for the searching.

The search server 11 receives an image transmitted from the operator terminal 50 via the network 1, and extracts one or more objects (hereinafter, extracted object) included in the received image, in which the search server 11 is used as a first receiver. When the search server 11 analyzes the extracted object detected in the received image, based on an analysis result of the extracted object, the search server 11 calculates a similarity level between the registered object searched in the image search DB 12 using the index information stored in the image search DB 12 and the extracted object detected in the received image. If the similarity level of the registered object searched from the image search DB 12 using the index information, and the extracted object detected in the received image is equal to a given threshold or more, the search server 11 acquires the index information corresponding to the registered object having the highest similarity level with respect to the extracted object, and acquires the attachment information associated with the acquired index information as a result of image searching. Then, the search server 11 returns the acquired attachment information to the transmission source of the captured image (e.g., operator terminal 50), in which the search server 11 is used as a first transmission unit.

Hereinafter, a description is given of the attachment information. In this description, the attachment information indicates a specific function such as a specific operation associated with each registration object, which may be corresponded to the extracted object detected in the received image (e.g., captured image). More specifically, the attachment information includes, for example, information of an access method used for accessing attribute information associated with each registration object. With this attachment information, an enhanced information service can be implemented. Since the attachment information indicates the specific operation associated with each registration object, which may be corresponded to the extracted object detected in the received image (e.g., captured image), it can be assumed that the attachment information stored in the image search DB 12 is associated with the extracted object detected in the received image (e.g., captured image). The attachment information is described in a language, for example, the extensible markup language (XML). The index information and the XML file including the description of the attachment information are associated with each other, and stored in the image search DB 12, with which the image of registration object and the attachment information are registered in the image searching system 10.

For example, if an object is extracted from the received image (e.g., captured image), the attachment information is used for acquiring one or more specific contents related to the extracted object. For example, the attachment information includes a specific uniform resource locator (URL) or a uniform resource identifier (URI) that is a higher notion of the URL. Hereinafter, unless otherwise stated, the URL and URI are collectively referred to as the URI.

The attachment information is not limited thereto. For example, the attachment information can be a URI of a commercial site where goods, shown as images of objects, are traded, and a URI of a purchase web page used for purchasing the goods. Further, the attachment information can be a telephone number and/or e-mail address associated with each object, such as each registration object. Further, the attachment information can be information for downloading data file associated with each registration object. Further, a plurality of attachment information can be associated with one registration object stored in the image search DB 12.

The registration terminal 20 transmits an image of a registration object and attachment information associated to the image of the registration object to the image searching system 10, and registers and stores the image of the registration objects and the attachment information in the image search DB 12.

In this configuration, a service provider that provides a service performed by the image searching system 10 allows a person or an organization that has signed a specific contract to register the images of registration objects and the attachment information in the image search DB 12 disposed in the image searching system 10. Hereinafter, the person or the organization that has signed the specific contract with the service provider is referred to as a client or customer. Specifically, the service provider registers the images of registration objects and the attachment information, provided from the client, in the image searching system 10 in response to a request received from the client. Depending on the contents of the specific contract, the client can register the images of registration objects and the attachment information in the image searching system 10 by operating the registration terminal 20. That is, the registration terminal 20 is a terminal that can be used by the service provider and/or the client.

In this configuration, a person who operates the operator terminal 50 to be described later is referred to as a general user or end user.

As illustrated in FIG. 1, the client system 30 includes, for example, a client server 31, and a contents storage unit 32. The client system 30 is operated and managed by the above described client. The client server 31 manages the client system 30 entirely. The contents storage unit 32 stores contents, prepared by the client, which can be provided to the general user (end user) when the general user operates the operator terminal 50. The client server 31 assigns a specific URL indicating a specific storage location (position) on the network 1 for each one of specific contents stored in the contents storage unit 32. An apparatus, such as the operator terminal 50, can acquire each specific content stored in the contents storage unit 32 via the network 1 based on the specific URL assigned to each specific content.

The contents storage unit 32 can store any type of contents with no particular limitation. In this description, it is assumed that the contents storage unit 32 stores, for example, images of augmented reality (AR) as the contents. Hereinafter, the images of augmented reality (AR) are referred to as AR image or AR images. For example, the AR image may be a frame image used for adding a frame to an image captured by a camera, but not limited thereto.

The external service providing server 40 is operated by a third-party person or organization, different from the service provider and the client. The external service providing server 40 provides a specific service to the general user (end user). The external service providing server 40 can provide any type of the specific services to the general user with no particular limitation. For example, the external service providing server 40 can be configured to provide a questionnaire service, such as a web-site questionnaire service, to the general user, in which the web-site questionnaire service distributes questionnaire to the general user, and collects and outputs a questionnaire result. The questionnaire service is one example of the specific services providable by the external service providing server 40.

The SNS server 60 provides a social 1 networking service (SNS).

The operator terminal 50 can be operated by the general user, and has an imaging function, such as image capturing unit using a camera, and image acquiring function. Further, the operator terminal 50 can be configured to store one or more images used as the target of searching (hereinafter, search target image) without installing the imaging function unit. Further, the operator terminal 50 can be configured to include the imaging function unit and to store the search target image.

The operator terminal 50 is installed with a search application, which is an application program for using the image searching operation performable by the image searching system 10. The search application can be installed in the operator terminal 50 by the general user. For example, the general user designates a to-be-installed search application (application program) on a download site on the network 1, and then downloads and installs the search application in the operator terminal 50.

When the search application is executed in the operator terminal 50, the operator terminal 50 activates the imaging function unit to capture an image of an object 51 (actual object) using a camera, and transmits a request for searching (hereinafter, search request) an image similar to the captured image of the object 51 to the image searching system 10 via the network 1. The search request transmitted from the operator terminal 50 is received by the search server 11 disposed in the image searching system 10.

In response to receiving the search request including the captured image from the operator terminal 50 at the image searching system 10, the search server 11 searches a registration object, which is similar or close to the object 51 (i.e., extracted object) shown in the captured image, in the image search DB 12, and transmits attachment information associated with the searched registration object to the operator terminal 50. For example, if the operator terminal 50 transmits the search request including the captured image of the object 51 to the image searching system 10, and the search server 11 searches and transmits the attachment information including a URL to the operator terminal 50, the operator terminal 50 can access a web site, designated by the URL included in the attachment information, via the network 1.

Figure 2:
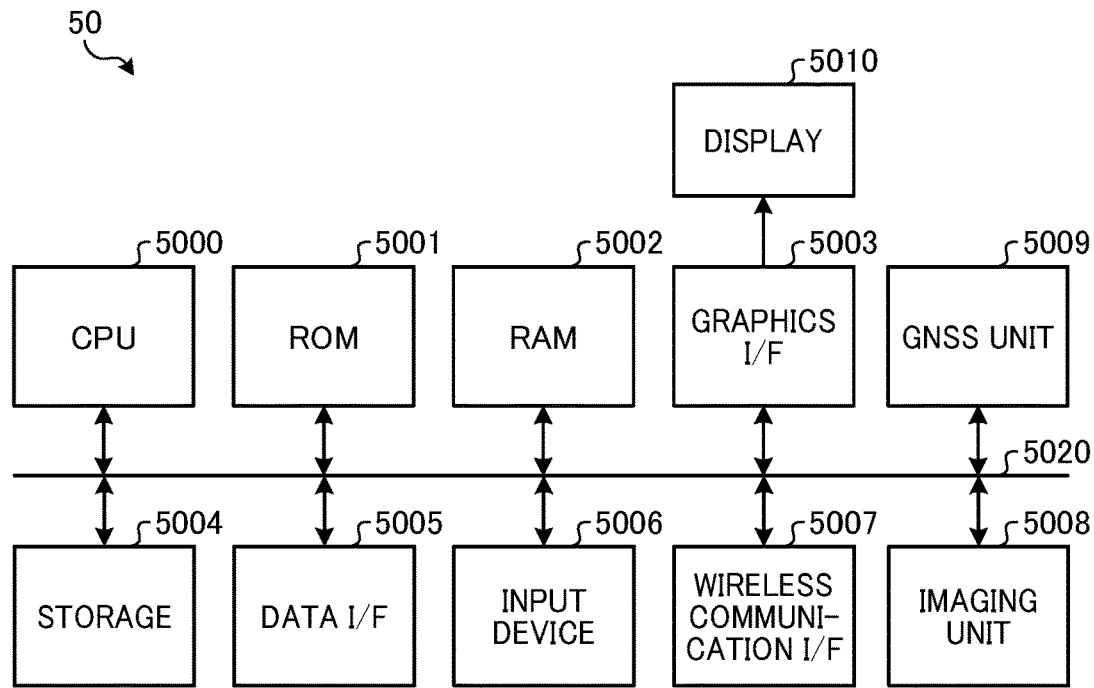
FIG. 2 illustrates an example of a hardware block diagram of an operator terminal applicable to each embodiment.

FIG. 2 illustrates an example of a hardware block diagram of the operator terminal 50 applicable to each embodiment. As illustrated in FIG. 2, the operator terminal 50 includes, for example, a central processing unit (CPU) 5000, a read only memory (ROM) 5001, a random access memory (RAM) 5002, and a graphics interface (I/F) 5003, connected to a bus 5020. The operator terminal 50 further includes, for example, a storage 5004, a data I/F 5005, an input device 5006, a wireless communication I/F 5007, an imaging unit 5008, and a global navigation satellite system (GNSS) unit 5009, which are connected to the bus 5020. In this configuration, the operator terminal 50 is an information processing apparatus including a general computer configuration including the CPU 5000, the ROM 5001, and the RAM 5002.

The storage 5004 is a storage medium or device capable of storing data in a non-volatile state. The storage 5004 is, for example, a nonvolatile semiconductor memory, such as a flash memory, but not limited thereto. For example, the storage 5004 can be a hard disk drive (HDD). The storage 5004 stores programs and various data to be executed by the CPU 5000. Further, the storage 5004 and ROM 5001 can be integrated in, for example, one rewritable nonvolatile semiconductor memory.

The CPU 5000 uses the RAM 5002 as a work memory in accordance with programs stored in the ROM 5001 and the storage 5004 to control the entirety of the operator terminal 50. The graphics I/F 5003 converts a display control signal generated by the CPU 5000 into a signal displayable by the display 5010, and outputs the signal. The display 5010 includes, for example, a liquid crystal display (LCD), and is driven by the signal output from the graphics I/F 5003 to display a screen such as a screen image corresponding to the display control signal.

The data I/F 5005 inputs and outputs data to and from an external device. The data I/F 5005 can use, for example, an interface of universal serial bus (USB) or Bluetooth (registered trademark).

The input device 5006 receives a user input. The user can input an instruction to the operator terminal 50 by operating the input device 5006 in accordance with, for example, information displayed on the display 5010. In the operator terminal 50, the input device 5006 can be integrally configured with the display 5010 as a touch panel. In this configuration, a screen (e.g., screen image) generated on the display 5010 is translucent through the touch panel, and when a given position on the screen is pressed or contacted by a pointer (e.g., finger), a control signal corresponding the pressed position is output.

The wireless communication I/F 5007 performs communication via a network under the control of the CPU 5000 via wireless communication.

The imaging unit 5008 includes, for example, an optical system unit, an image capturing element, and a drive control circuit that controls the optical system unit and the image capturing element. In the imaging unit 5008, image signals output from the image capturing element are processed by performing given processing to generate digital signals, and then the digital signals are output, for example, as a movie image having a given frame rate, in which the movie image is output as the captured image. The imaging unit 5008 can use any image capture device such as a camera. The imaging unit 5008 can be configured to capture an image included in the movie image in accordance with a timing of a shutter, and store the captured image as a still image in, for example, the storage 5004. Hereinafter, unless otherwise stated, the captured image is assumed as a still image. Further, the CPU 5000 reads the captured image from the storage 5004, and transmits the captured image to the network 1 using the wireless communication I/F 5007.

The GNSS Unit 5009 uses a satellite to measure or identify a current location of the operator terminal 50, carried by the general user (end user), using a global navigation satellite system (GNSS) that measures or identify the current location of the operator terminal 50 on Earth. The GNSS unit 5009 can output a combination of location information, such as coordinate information including at least the latitude and longitude of the current location, and time information indicating the measurement timing as a measurement result. The GNSS unit 5009 can use any GNSS device such as global positioning system (GPS) device. The GNSS Unit 5009 can be used to measure or identify the past location of the operator terminal 50, if needed, based on the record of locations of the operator terminal 50.

Figure 3:
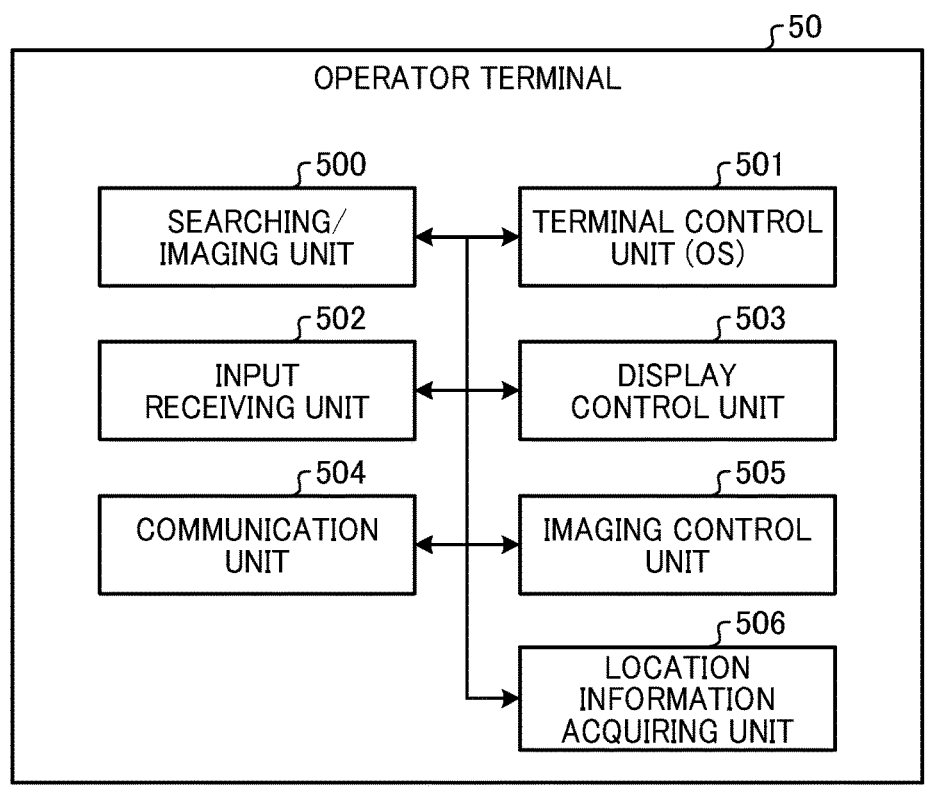
FIG. 3 illustrates an example of a functional block diagram of the operator terminal of a first embodiment.

FIG. 3 illustrates an example of a functional block diagram of the operator terminal 50 of the first embodiment. The operator terminal 50 includes, for example, a searching/imaging unit 500, a terminal control unit 501, an input receiving unit 502, a display control unit 503, a communication unit 504, an imaging control unit 505, and a location information acquiring unit 506.

The searching/imaging unit 500, the terminal control unit 501, the input receiving unit 502, the display control unit 503, the communication unit 504, the imaging control unit 505, and the location information acquiring unit 506 are implemented by executing programs using the CPU 5000, but not limited thereto. For example, except the searching/imaging unit 500, a part or all of the terminal control unit 501, the input receiving unit 502, the display control unit 503, the communication unit 504, the imaging control unit 505, the location information acquiring unit 506 can be implemented using hardware circuits that operate cooperatively with each other.

The searching/imaging unit 500 executes image search processing in the operator terminal 50 according to the embodiments described in this disclosure. The searching/imaging unit 500 is configured in the operator terminal 50 by installing a search application that a service provider has distributed to the client who has signed a specific contract, or by installing the search application customized by the client (customized application) in the operator terminal 50.

The terminal control unit 501 controls the functions of the operator terminal 50 entirely. The terminal control unit 501 is, for example, an operating system (OS). The input receiving unit 502 receives an input operation performed to the input device 5006, and outputs input information in accordance with the input operation. The display control unit 503 generates a display control signal to be supplied to the graphics I/F 5003. The communication unit 504 controls communication performed via the wireless communication I/F 5007. The imaging control unit 505 controls the imaging operation of the imaging unit 5008 in accordance with an instruction from the searching/imaging unit 500 and/or the terminal control unit 501. The location information acquiring unit 506 controls acquisition of the location information and the time information using the GNSS unit 5009.

Figure 4:
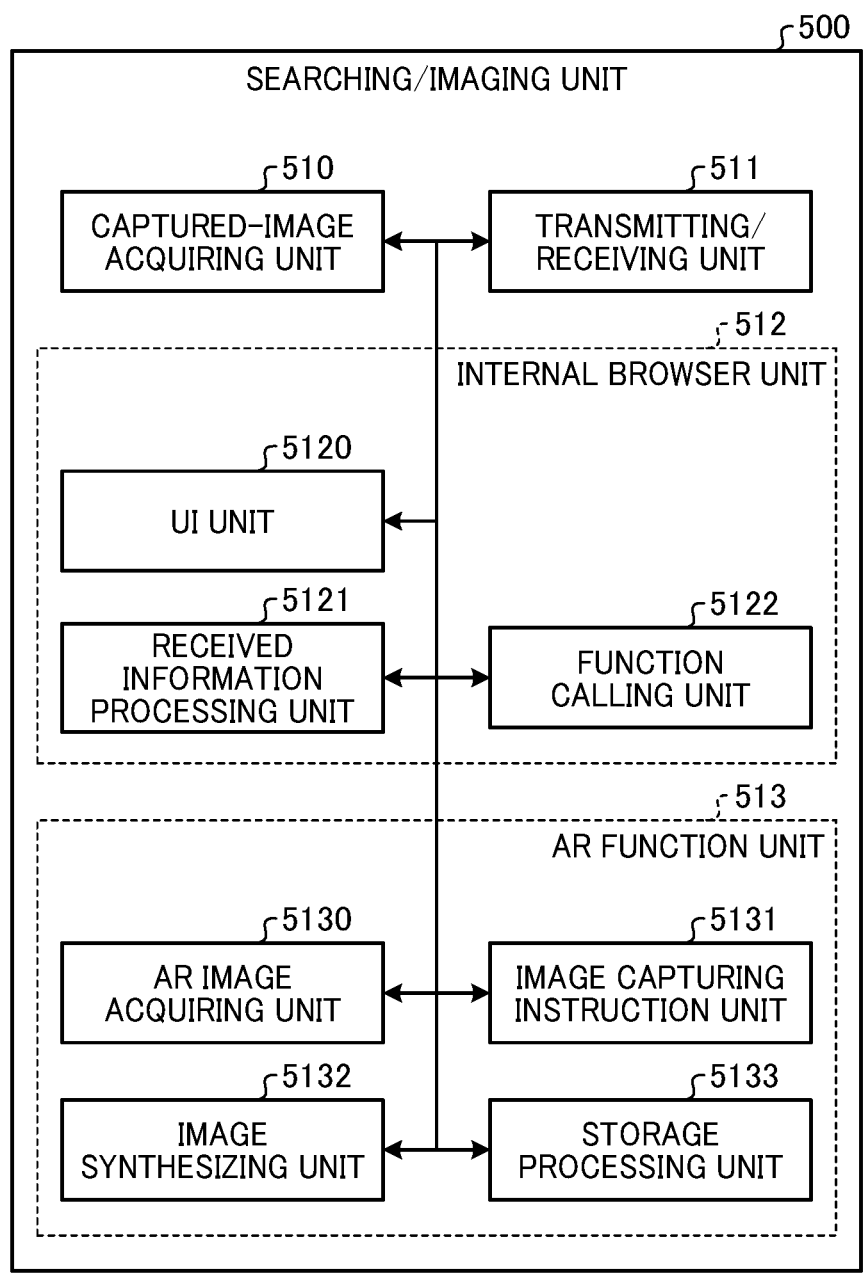
FIG. 4 illustrates an example of a functional block diagram of a searching/imaging unit of the operator terminal of the first embodiment.

FIG. 4 illustrates an example of a functional block diagram of the searching/imaging unit 500 of the operator terminal 50 of the first embodiment. As illustrated in FIG. 4, the searching/imaging unit 500 includes, for example, a captured-image acquiring unit 510, a transmitting/receiving unit 511, an internal browser unit 512 (second execution unit, second application), and an AR function unit 513 (first execution unit, first application). The captured-image acquiring unit 510 requests the imaging control unit 505 to acquire an image captured by the imaging unit 5008, and acquires the captured image output from the imaging unit 5008 as a response of the request. The transmitting/receiving unit 511 (second transmission unit, second reception unit) transmits and receives data via the network 1 using the communication unit 504.

As illustrated in FIG. 4, the internal browser unit 512 includes, for example, a user interface (UI) unit 5120, a received information processing unit 5121, and a function calling unit 5122. The received information processing unit 5121 analyzes information received by the transmitting/receiving unit 511, and performs processing on the information based on an analysis result. The UI unit 5120 generates a screen (e.g., screen image) including one or more user interfaces (UIs). For example, the UI unit 5120 generates the screen (e.g., screen image) including one or more UI images to be displayed on the display 5010, and receives one or more operations performed to the one or more UI images on the screen (e.g., screen image) using the input device 5006. The function calling unit 5122 (second application) activates the AR function unit 513 (first application) based on the analysis result and the processing result of the received information processing unit 5121.

For example, in response to receiving an URI, the transmitting/receiving unit 511 transfers the received URI to the internal browser unit 512 in the internal browser unit 512. Then, the received information processing unit 5121 analyzes the URI transmitted from the transmitting/receiving unit 511 to acquire information of a web site corresponding to the URI, and if hypertext transfer protocol (HTTP) is designated as a protocol, the received information processing unit 5121 accesses the web site via the transmitting/receiving unit 511 using the HTTP.

Then, the received information processing unit 5121 analyzes information returned from the web site as the response of accessing the web site, and transfers an analysis result of the information to the UI unit 5120. Based on the analysis result received from the received information processing unit 5121, the UI unit 5120 generates a screen (e.g., screen image) for displaying a web page defined for the web site. The screen (e.g., screen image) generated by the UI unit 5120 is displayed on the display 5010, and then the general user can view the screen (e.g., screen image) displayed on the display 5010 as the web page.

When the AR function unit 513 is called and activated by the function calling unit 5122, the AR function unit 513 acquires a specific content in accordance with the URI designated at the time of activation. In this specification, it is assumed that the AR function unit 513 acquires an AR image of a frame image as the specific content. For example, it is assumed that the frame image is stored as the AR image in the contents storage unit 32 in the client system 30, and the AR function unit 513 designates the URL of the AR image (e.g., frame image).

The AR image that can be acquired by the AR function unit 513 is not limited to the frame image. Further, in addition to the AR image, the AR function unit 513 can be configured to acquire other contents.

As illustrated in FIG. 4, the AR function unit 513 includes, for example, an AR image acquiring unit 5130, an image capturing instruction unit 5131, an image synthesizing unit 5132, and a storage processing unit 5133. The AR image acquiring unit 5130 (content acquiring unit) acquires an AR image in accordance with a URL designated for the AR function unit 513. The image capturing instruction unit 5131 instructs the captured-image acquiring unit 510 to perform an imaging process using the AR image acquired via the AR image acquiring unit 5130.

More specifically, the image capturing instruction unit 5131 transfers the captured image (e.g., movie image, still image) output from the imaging unit 5008, and the AR image acquired by the AR image acquiring unit 5130, to the UI unit 5120. The UI unit 5120 displays an image that is synthesized from the captured image and the AR image on the display 5010 as a finder image.

In response to receiving a shutter operation to the input device 5006, the UI unit 5120 notifies the shutter operation to the image capturing instruction unit 5131 and the image synthesizing unit 5132. Then, in response to the notification of the shutter operation, the image capturing instruction unit 5131 instructs the imaging unit 5008 to capture an image of an actual object as the captured image.

The image synthesizing unit 5132 synthesizes the image captured by the imaging unit 5008 (i.e., captured image) in response to the shutter operation, and the AR image acquired by the AR image acquiring unit 5130 to generate an image synthesized from the captured image and the AR image and as a synthesized image. The image capturing instruction unit 5131 and the image synthesizing unit 5132 configure an imaging control unit that performs the image capturing processing using the imaging unit 5008, and synthesizes the captured image and the AR image as the synthesized image.

When a data saving operation is performed via the input device 5006, and the UI unit 5120 receives an instruction of saving the generated synthesized image, the storage processing unit 5133 stores the synthesized image, for example, in the storage 5004. After the storage processing unit 5133 stores the synthesized image, the storage processing unit 5133 instructs the UI unit 5120 to display a menu screen including a message indicating a transmission of the synthesized image to one or more SNS servers 60.

The information processing program (e.g., search application) for implementing each function of the searching/imaging unit 500 of the first embodiment can be recorded on a recording medium readable by a computer such as a compact disk (CD), a flexible disk (FD), or a digital versatile disk (DVD) in an installable format or executable format file, but not limited thereto. Further, the display control program may be stored on a computer connected to a network such as the Internet and downloaded via, the network to provide the display control program. Alternatively, the display control program may be configured to be provided or distributed via a network such as the Internet.

The information processing program includes, for example, a module configuration including each of the above described components such as the captured-image acquiring unit 510, the transmitting/receiving unit 511, the internal browser unit 512, and the AR function unit 513. As an actual hardware, the CPU 5000 reads the information processing program from a storage medium such as the storage 5004$m$ and executes the information processing program, with which the above described components are loaded onto the main storage device such as the RAM 5002, and the captured-image acquiring unit 510, the transmitting/receiving unit 511, the internal browser unit 512, and the AR function unit 513 are generated on the main storage device.

Figure 5:
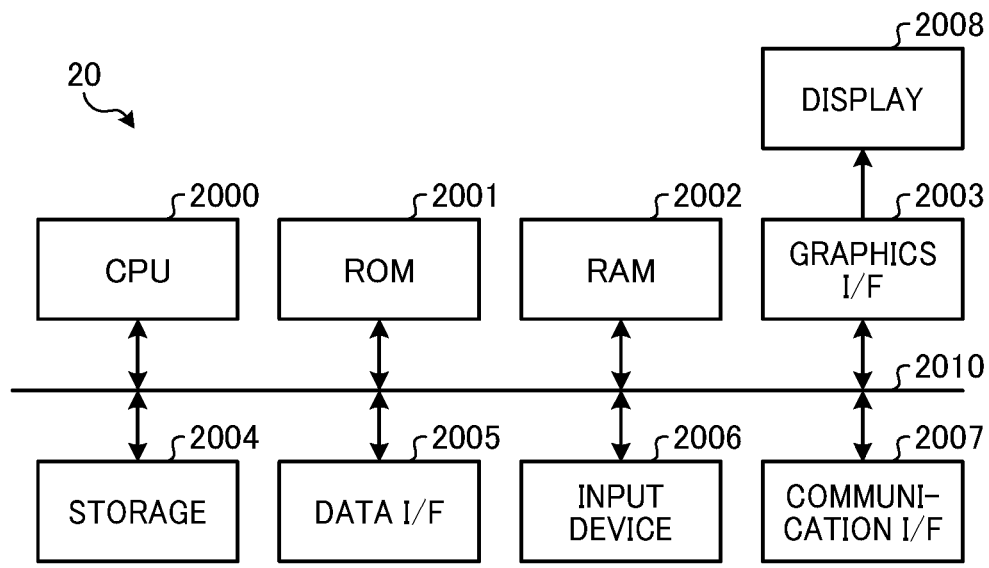
FIG. 5 illustrates an example of a hardware block diagram of a registration terminal of the first embodiment.

FIG. 5 illustrates an example of a hardware block diagram of the registration terminal 20 of the first embodiment. As illustrated in FIG. 5, the registration terminal 20 includes, for example, a CPU 2000, a ROM 2001, a RAM 2002, and a graphics I/F 2003 connected to a bus 2010. The registration terminal 20 further includes, for example, a storage 2004, a data I/F 2005, an input device 2006, and a communication I/F 2007 connected to the bus 2010. The registration terminal 20 is used as an information processing apparatus including a general computer configuration including the CPU 2000, the ROM 2001, and the RAM 2002.

The storage 2004 is a storage medium capable of storing data in a non-volatile state. The storage 2004 is, for example, a nonvolatile semiconductor memory, such as a flash memory, but not limited thereto. For example, the storage 2004 can be a hard disk drive (HDD). The storage 2004 stores programs and various data to be executed by the CPU 2000. The storage 2004 and ROM 2001 can be integrated in, for example, one rewritable nonvolatile semiconductor memory.

The CPU 2000 uses the RAM 2002 as a work memory in accordance with the programs stored in the ROM 2001 and the storage 2004, and controls the entirety of the registration terminal 20. The graphics I/F 2003 converts a display control signal generated by the CPU 2000 into a signal displayable by the display 2008, and outputs the signal. The display 2008 includes, for example, a liquid crystal display (LCD), and is driven by the signal output from the graphics I/F 2003 to display a screen (e.g., screen image) corresponding to the display control signal.

The data I/F 2005 inputs and outputs data to and from an external device. As the data I/F 2005 can use, for example, an interface of universal serial bus (USB) or Bluetooth (registered trademark).

The input device 2006 receives a user input. The user can input an instruction to the registration terminal 20 by operating the input device 2006 in accordance with, for example, information displayed on the display 2008. The communication I/F 2007 performs communication via the network 1 under the control of the CPU 2000.

Since the hardware configuration of FIG. 5 is applicable to the search server 11 and the client server 31 illustrated in FIG. 1, the description of the hardware configuration of the search server 11 and the client server 31 are omitted. The search server 11 and the client server 31 can be configured as one information processing apparatus, or a plurality of information apparatuses to distribute processing.

Figure 6:
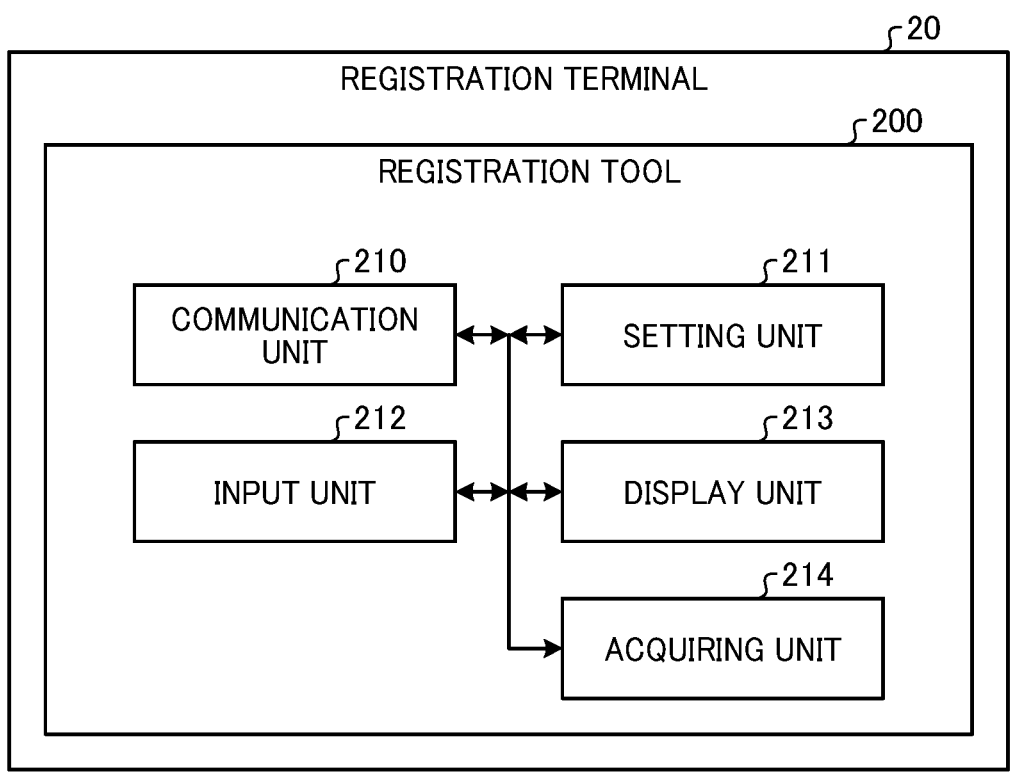
FIG. 6 illustrates an example of a functional block diagram of the registration terminal of the first embodiment.

FIG. 6 illustrates an example of a functional block diagram of the registration terminal 20 of the first embodiment. As illustrated in FIG. 6, the registration terminal 20 includes, for example, a registration tool 200. The registration tool 200 includes, for example, a communication unit 210, a setting unit 211, an input unit 212, a display unit 213, and an acquiring unit 214.

The communication unit 210 controls the communication PF 2007 to communicate via the network 1. The input unit 212 receives information input by an input operation to the input device 2006. The setting unit 211 sets attachment information for each registration target image corresponding to each registration object. The display unit 213 generates display information to be displayed on the display 2008.

The acquiring unit 214 acquires images from an external device or network connected to the registration terminal 20. For example, the acquiring unit 214 can acquire images transmitted from other devices via a network, or can receive images via a recording medium such as a compact disk (CD) and a digital versatile disk (DVD). Further, the acquiring unit 214 can acquire images from print media such as sheets (e.g., paper). Further, for example, in accordance with information received via the input unit 212, the acquiring unit 214 acquires information for the attachment information to be associated with the registration target image.

Each unit of the registration tool 200 (i.e., communication unit 210, setting unit 211, input unit 212, display unit 213, and acquiring unit 214) included in the registration terminal 20 is implemented by executing programs using the CPU 2000.

More specifically, the registration terminal 20 is installed with a browser application (hereinafter, browser) that is equivalent to an application installed in a general computer. The browser, operated on the CPU 2000, reads a file described in a language, such as hypertext markup language (HTML) to perform a given operation.

For example, the image searching system 10 stores programs for configuring the registration tool 200 of the registration terminal 20 in the storage of the image searching system 10 in advance. When the registration terminal 20 reads out the programs stored in the image searching system 10 using the browser installed in the registration terminal 20, the registration tool 200 is implemented in the registration terminal 20 by loading and executing the programs by the browser. Alternatively, a server storing the programs can be separately provided.

Processing of First Embodiment

Hereinafter, a description is given of processing of in the information processing system 1000 of the first embodiment. The information processing system 1000 of the first embodiment is configured to acquire an AR image from the client system 30 based on the captured image captured by the operator terminal 50.

In the first embodiment, the operator terminal 50 transmits the captured image captured by the imaging unit 5008 to the image searching system 10, and requests the image searching system 10 to perform an image searching. In response to the image searching request transmitted to the image searching system 10, the image searching system 10 transmits the attachment information to the operator terminal 50 as a result of the image searching. Then, the operator terminal 50 acquires a specific URI from the received attachment information. If the acquired specific URI includes a given text string, the operator terminal 50 uses the function calling unit 5122 (i.e., second application) to call the AR function unit 513 (i.e., first application), acquires an AR image from the client system 30 using the AR function unit 513, and then performs the imaging process using the captured image and the acquired AR image.

Example 1 of First Embodiment

Hereinafter, a description is given of an example 1 of the first embodiment with reference to FIG. 7. In the example 1 of the first embodiment, the operator terminal 50 accesses the external service web site 41 provided by the external service providing server 40 based on the attachment information acquired as the result of image searching, and then the operator terminal 50 acquires a specific URI including a given text string from the external service web site 41.

Figure 7:
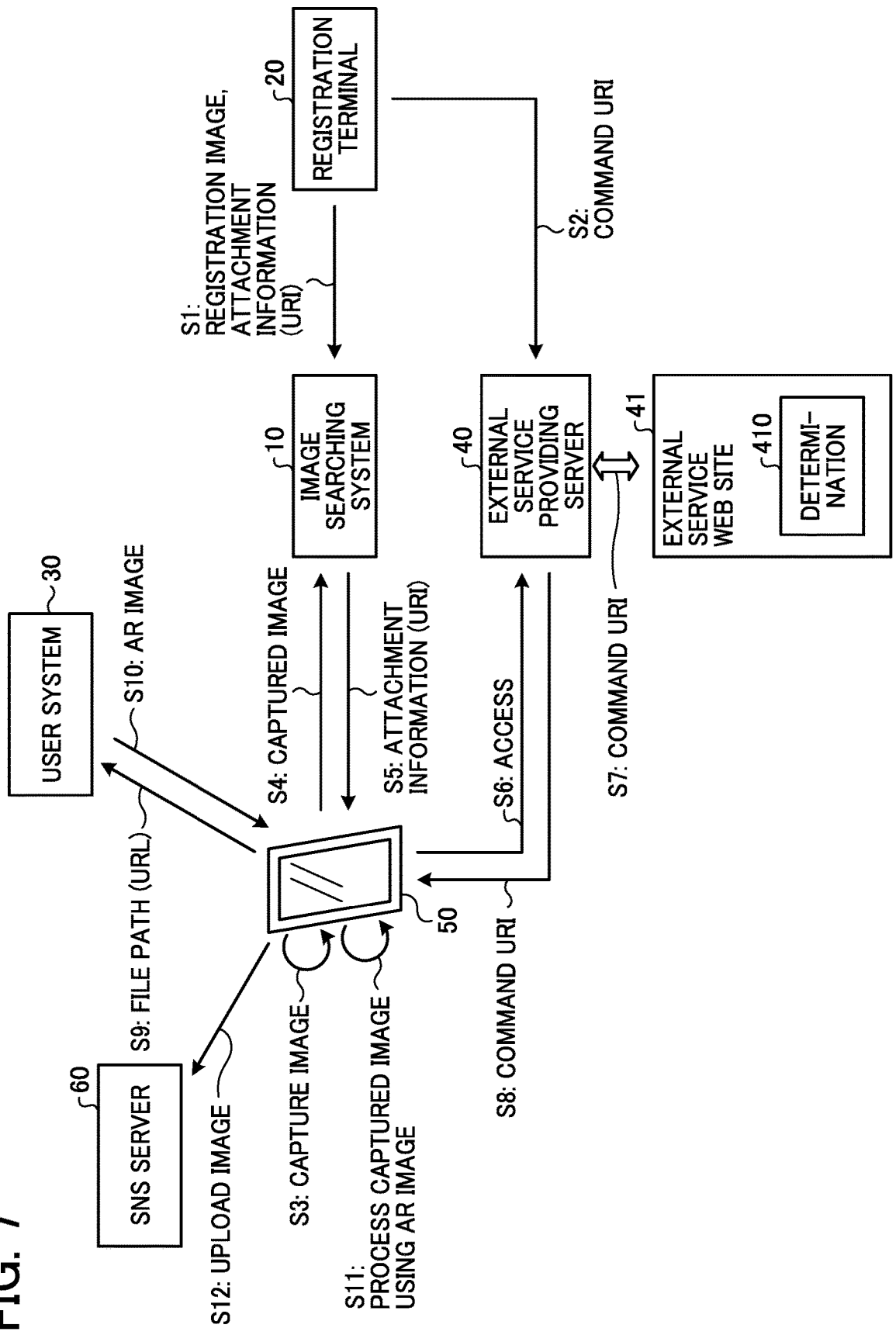
FIG. 7 illustrates a schematic diagram of processing of an example 1 of the first embodiment.

In FIG. 7, at first, the registration terminal 20 is used to register images of one or more of registration objects (hereinafter, registration image of registration object), to be searched with respect to the captured image, and the attachment information associated with the registration image in the image searching system 10 (step S1). The registration image and the attachment information can be registered by a client or a service provider based on a request from the client. The attachment information to be registered includes, for example, a URI (URL) of the external service web site 41.

Figure 9:
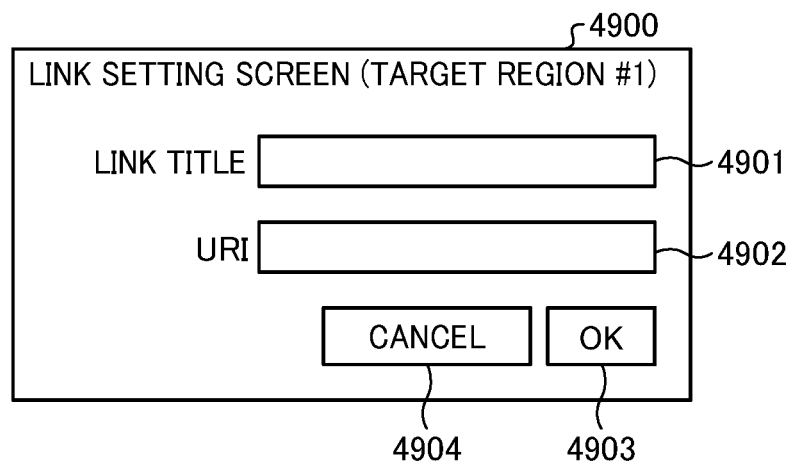
FIG. 9 illustrates an example of an attachment information setting screen applicable to the first embodiment.
Figure 10:
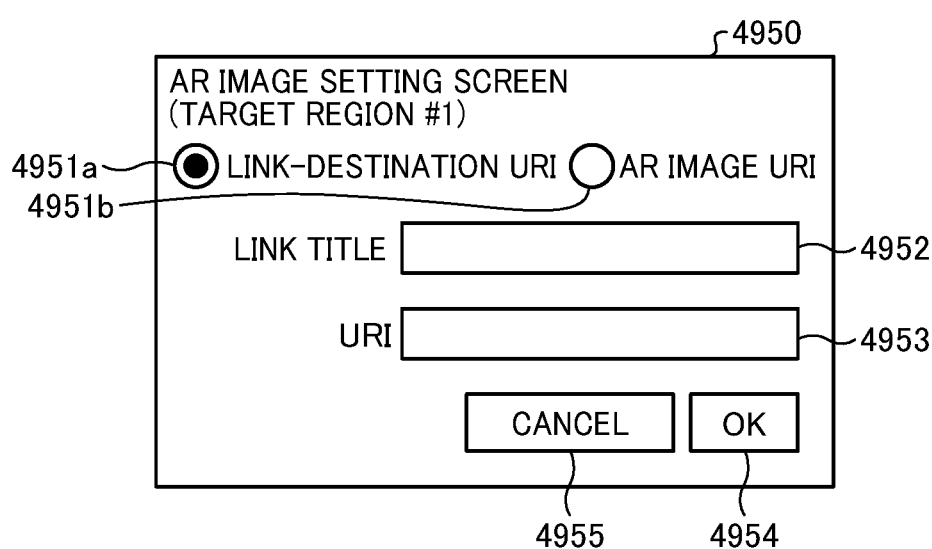
FIG. 10 illustrates an example of an augmented reality (AR) image setting screen applicable to the first embodiment.

Hereinafter, a description is given of an example of a registration screen displayed by the registration tool 200 on the registration terminal 20 with reference to FIGS. 8 to 10. Each registration screen illustrated in FIGS. 8 to 10 is displayed on the registration terminal 20 when the browser installed in the registration terminal 20 executes the programs read from the image searching system 10.

Figure 8:
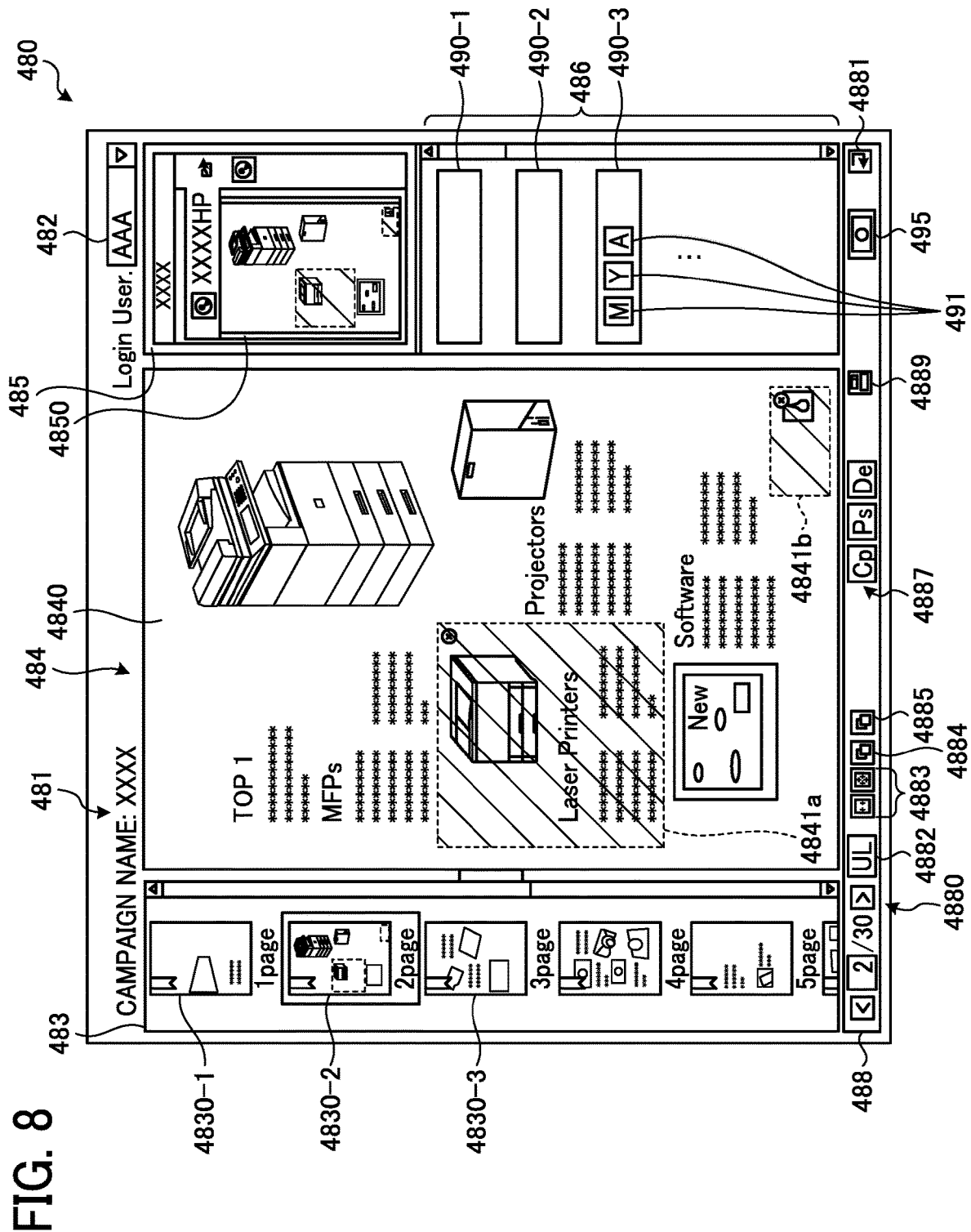
FIG. 8 illustrates an example of a registration screen of the first embodiment.

FIG. 8 illustrates an example of a registration screen 480 in the first embodiment. As illustrated in FIG. 8, the registration screen 480 includes, for example, a header region 481, a thumbnail display region 483, a page edit region 484, a preview region 485, a target region list section 486, and a toolbar 488.

In the header region 481, a name of a to-be-registered campaign is displayed at the top left end of the registration screen 480 while a user menu display unit 482 is arranged at the top right end of the registration screen image 480. The user menu display unit 482 displays a menu available for use by a user who logs in the registration terminal 20 using a user access right. The campaign includes, for example, a series of services providing an AR image to the user (e.g., general user) from the client server 31.

The thumbnail display region 483 displays thumbnail images 4830-1, 4830-2, 4830-3, and so on obtained by reducing the size of each image related to the campaign. For example, a client loads the registration images relating to the campaign into the registration terminal 20 in advance, and stores the images in the storage 2004. If no registration images are stored in the registration terminal 20, the thumbnail display region 483 displays no images (i.e., blank).

The page edit region 484 displays an edit-target image 4840, to be edited, among the registration images included in the campaign. For example, the registration tool 200 displays an original image of thumbnail images selected from the thumbnail images 4830-1, 4830-2, 4830-3, displayed in the thumbnail display region 483 as the edit-target image 4840 in the page edit region 484.

For example, if a specific region in the edit-target image 4840 displayed in the page edit region 484 is designated in response to an operation to the input device 2006 by a user (e.g., client), the registration tool 200 can set the designated region as a target region (see region indicated by dotted lines in FIG. 8). In an example illustrated in FIG. 8, each of target regions 4841a and 4841b is set by designating a rectangular region in the edit-target image 4840 displayed in the page edit region 484. The registration tool 200 generates identification information identifying each of the target regions 4841a and 4841b, and associates the identification information with each of the target regions 4841a and 4841b.

The preview region 485 displays a preview image 4850. The preview image 4850 emulates a screen image displayed on the operator terminal 50 by the searching/imaging unit 500, which corresponds to the image being in editing in the page editing region 484.

The target region list section 486 displays a list of buttons 490-1, 490-2, 490-3 indicating each target region. Each of the buttons indicates the attachment information added to each of the target regions set for each image included in the to-be-edited campaign. For example, the target region can include a plurality of attachment information such as plurality of icons 491 included in the button 490-3. By designating the buttons 490-1, 490-2, 490-3, a screen (e.g., screen image) used for setting the attachment information is displayed. Hereinafter, the screen used for setting the attachment information is referred to as the attachment information setting screen.

FIG. 9 illustrates an example of the attachment information setting screen 4900 displayed by the registration tool 200 when any one of the buttons 490-1, 490-2, 490-3 applicable to the first embodiment are designated. In FIG. 9, the attachment information setting screen 4900 includes, for example, a title input field 4901, an URI input field 4902, and buttons 4903 and 4904. In this example case of FIG. 9, the attachment information setting screen 4900 is illustrated as a link setting screen. The title input field 4901 is used for inputting a title of the attachment information to be set in the attachment information setting screen 4900. The URI input field 4902 is used for inputting a URI (URL) as the attachment information. In this example case of FIG. 9, the URI input field 4902 is input with a URI (URL) as the attachment information, which is the link information indicating a link to an information resource (content source) disposed on the network 1.

The button 4903 is used to enter content information input in the input fields 4901 and 4902, and the registration tool 200 stores the content information input to the input fields 4901 and 4902 when the button 4903 is operated. The button 4904 is used to cancel processing performed on the attachment information setting screen 4900, and the registration tool 200 discards the content information input to the input fields 4901 and 4902 when the button 4904 is operated.

Although it is described that the URI is set as the attachment information, information that can be set as the attachment information is not limited to the URI. For example, in addition to the URI, other information, such as a telephone number, location information (e.g., latitude, longitude), which can be used for the operator terminal 50, can be used as the attachment information.

The description of FIG. 8 is further continued. The toolbar 488 includes, for example, a page designation section 4880 for designating a page (image) to be displayed in the page edit region 484, buttons 4881, 4882, 4884, 4885, 4889, and button groups 4883 and 4887 used for executing various functions of the registration tool 200, and a button 495 for setting up an AR image. The button 4881 is used to return to the previous screen from the registration screen 480.

The button 4882 is used for uploading an image from the registration terminal 20 to the image searching system 10. When the button 4882 is operated, the registration tool 200 displays a file selection screen using the display unit 213. For example, the file selection screen can apply a standard file selection screen provided by an operating system operating on the CPU 2000 of the registration terminal 20.

By selecting a desired image file in the file selection screen and performing a given operation, the registration terminal 20 transmits the selected image file to the image searching system 10. The image searching system 10 stores the image file transmitted from the registration terminal 20 in, for example, a storage or a memory included in the search server 11.

The button group 4883 includes, for example, two buttons for adjusting a display size of the edit-target image 4840 displayed in the page edit region 484.

The button 4884 is used to switch a region setting mode for setting a region in the page edit region 484. Specifically, the button 4884 is used to switch the region setting mode to a target region setting mode used for setting a target region. When the button 4884 is operated and the edit mode is switched to the target region setting mode, and a specific region is designated on the edit-target image 4840 displayed in the page edit region 484, the registration tool 200 sets the specific region as the target region.

The button 4885 is used to switch a region setting mode for designating a region in the page edit region 484. Specifically, the button 4885 is used to switch the region setting mode to a mask setting mode designating a mask region not to be subjected to the extraction processing of feature information by the search server 11. When the button 4885 is operated and the edit mode is switched to the mask setting mode, and a specific region is designated on the edit-target image 4840 displayed in the page edit region 484, the registration tool 200 sets the specific region as the mask region.

The button group 4887 includes, for example, three buttons for performing copying, pasting, and deleting information. The button 4889 is used to instruct the image searching system 10 to save the campaign being edited on the registration screen 480. In response to the operation of the button 4889, the image uploaded from the registration terminal 20 and the attachment information attached to the uploaded image are stored and registered in the image search DB 12 of the image searching system 10.

In the first embodiment, the button 495 for setting up an AR image is further arranged on the toolbar 488. For example, when a client operates the button 495, and then the button (e.g., button 490-1 in FIG. 8) indicating the target region, to be used for acquiring the AR image by a general user, is operated, an AR image setting screen is displayed.

FIG. 10 illustrates an example of an AR image setting screen 4950 applicable to the first embodiment. As illustrated in FIG. 10, the AR image setting screen 4950 includes, for example, radio buttons 4951a and 4951b, a title input field 4952, a URI input field 4953, and buttons 4954 and 4955.

The title input field 4952 is used for inputting a title of the attachment information to be set in the AR image setting screen 4950.

The URI input field 4953 is used for inputting a URI (URL) as the attachment information. If the radio button 4951a is checked (as indicated by a black dot in FIG. 10), the URI, input to the URI input field 4953, is set as the URI of a specific web site, which is used as the link destination. By contrast, if the radio button 4951b is checked, the URI, input to the URI input field 4953, is assigned to the AR image stored in the client server 31 as the URI indicating a specific storage location of the AR image on the network 1. The radio buttons 4951a and 4951b are mutually exclusive radio buttons in this example case.

The button 4954 is used to enter the selection of the radio buttons 4951a and 4951b, and content information input to the title input field 4952 and the URI input field 4953 respectively corresponding to the radio buttons 4951a and 4951b. When the button 4954 is operated, the registration tool 200 stores the content information input to the title input field 4952 or the URI input field 4953 associated with the selection of the radio buttons 4951a or 4951b.

The button 4955 is used for canceling the processing performed on the AR image setting screen 4950. The registration tool 200 discards the content information input to the title input field 4952 and the URI input field 4953 when the button 4955 is operated.

In this example case of FIG. 10, it is assumed that the radio button 4951a is checked to set the web site URI as the link destination, and the URI of the external service providing server 40 is input to the URI input field 4953.

The description of FIG. 7 is further continued. When the registration of the search target image and the attachment information to the image searching system 10 is completed, the registration terminal 20 transmits the URI to be associated with a determination button 410 of the external service web site 41 to the external service providing server 40, (step S2). The contents of the external service web site 41 is not particularly limited. For the purpose of description, the external service web site 41 is assumed as a web site that performs a questionnaire service. Further, the processing in step S2 is not limited to the registration terminal 20, but can be performed from other terminals that can access the external service providing server 40.

Hereinafter, a description is given of a questionnaire input screen (e.g., screen image) generated by the external service web site 41 for performing a questionnaire service with reference to FIG. 11. FIG. 11 illustrates an example of a questionnaire input screen 4100 displayed, for example, on a display of the operator terminal 50. As illustrated in FIG. 11, the questionnaire input screen 4100 includes, for example, an answer input field 4101, and an answer button 4102. The answer input field 4101 is used for answering question items by using radio buttons or check boxes.

The answer button 4102, corresponding to the determination button 410 of FIG. 7, is used to answer the questionnaire. When the answer button 4102 displayed on the operator terminal 50 is operated, the external service web site 41 transmits the answer information input to the answer input field 4101 to the external service providing server 40. Further, a URI of another web site to be displayed after answering the questionnaire can be associated with the answer button 4102.

The external service providing server 40 can collect the questionnaire answer transmitted from the questionnaire input screen 4100. In addition, when identification information identifying each of the operator terminals 50 is added to the questionnaire answer, the external service providing server 40 can collect log information related to the questionnaire answer transmitted from each of the operator terminals 50.

Figures 12, 13A, 13B, 13C:
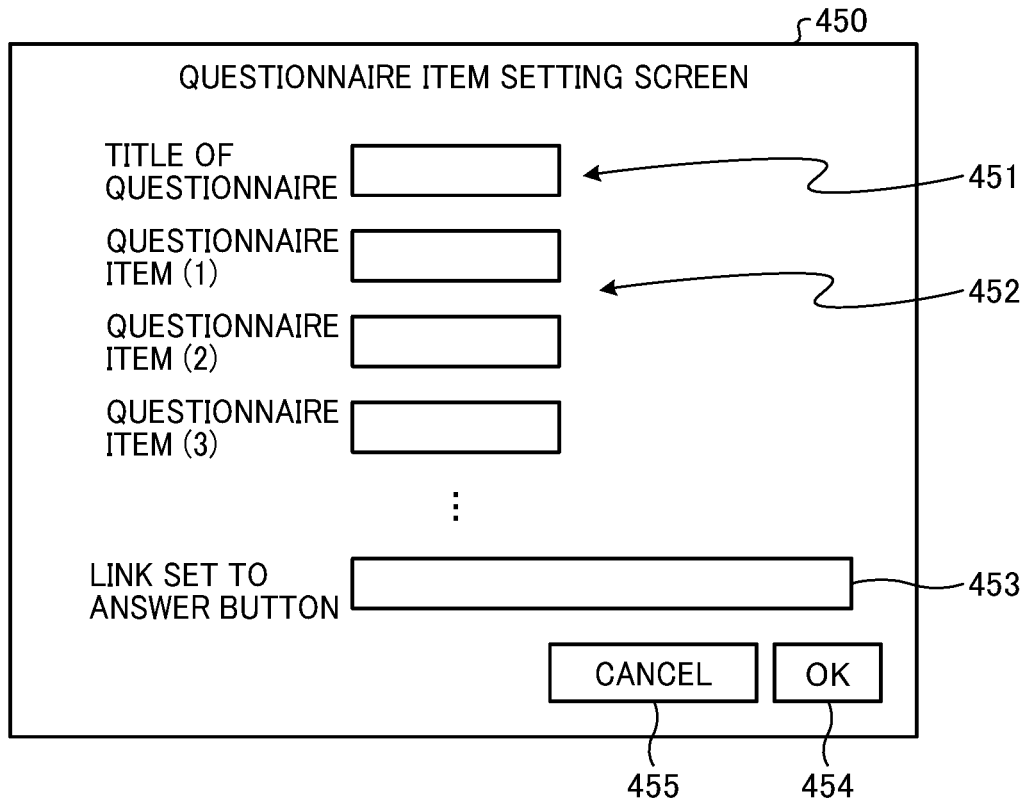
FIG. 12 illustrates an example of a questionnaire item setting screen applicable to the first embodiment.
FIGS. 13A, 13B, and 13C illustrate examples of specific uniform resource identifiers (URIs) including text string of the first embodiment.

FIG. 12 illustrates an example of a questionnaire item setting screen 450 applicable to the first embodiment. In an example illustrated in FIG. 12, the questionnaire item setting screen 450 includes, for example, a title input field 451, an item input field 452, a link input field 453, and buttons 454 and 455. In this example case, it is assumed that the questionnaire item setting screen 450 is displayed on the registration terminal 20, and each item in the questionnaire item setting screen 450 is set from the registration terminal 20.

The title input field 451 is used for inputting a title of a questionnaire set by the questionnaire item setting screen 450. The item input field 452, including one or more input items, is used for setting the respective questionnaire items. The link input field 453 is used for setting link information to the answer button 4102 (FIG. 11).

The button 454 is used to enter the content information input to each of the input fields 451 to 453. The registration terminal 20 transmits the content information input to each of the input fields 451 to 453 to the external service providing server 40 when the button 454 is operated. For example, the external service providing server 40 manages the content information input to each of the input fields 451 to 453 transmitted from the registration terminal 20 as setting information of one questionnaire.

The button 455 is used for canceling the processing performed on the questionnaire item setting screen 450. The registration terminal 20 discards the content information input to each of the input fields 451 to 453 when the button 455 is operated.

In example 1 of the first embodiment, a specific URI is input to the link input field 453 to associate and set the link information to the answer button 4102. For example, the specific URI includes a given text string for calling the AR function unit 513 in the operator terminal 50, and information indicating a storage location of the AR, stored in the contents storage unit 32 of the client system 30 image, on the network 1.

Hereinafter, a description is given of the specific URI including the given text string input to the link input field 453 in the first embodiment with reference to FIG. 13.

At first, a basic configuration of URI is described with reference to FIG. 13A. The URI includes at least a scheme and an authority component. The scheme corresponds to a portion starting from the beginning of the URI to the delimiter "://" defined by colon ":" and two slashes "II." The scheme specifies a rule for accessing an information resource indicated by each URI. For example, the scheme is described with a text string, such as characters indicating a protocol used for accessing the information resource. The authority component starts right after the delimiter "://" and complete at any one of the next slash "/," the next question mark "?", and the number symbol "#", or the authority component starts right after the delimiter "://" and complete at the end of the URI. The authority component includes, for example, a host name that stores the information resource indicated by each URI. The host name includes, for example, a server name, and a domain name.

In an example case of FIG. 13A, the text string of "http" corresponds to the scheme, and the scheme indicates that hypertext transfer protocol (HTTP) is used as the protocol. Further, the text string of "www.example.com" corresponds to the authority component, indicating that the host name is "www" and the domain name is "example.com." In the example case of FIG. 13A, a path component (text string of "user/index. html") is described right after the slash "/" indicating the aggregation of the authority component, and the path component indicates a specific position in the host.

FIG. 13B illustrates an example of a basic configuration of URI including a given text string that can be applied to the first embodiment. In the first embodiment, the given text string is applied to the scheme of the URI. In an example case of FIG. 13B, a text string of "clicker-ar" is used as the given text string. The given text string is not limited to the text string of "click-ar," but can be any text string if the text string is not yet defined as the scheme of the URI.

In the example case of FIG. 13B, the URI includes a text string of "image" as the host name, a question mark "?" used as the delimiter, and a query component of "url=<image url>" after the delimiter. In the example case of FIG. 13B, the query component includes the text string of "url=" indicating a description after the text string of "url=" is a URL, and the text string of "<image url>" indicating that the URL is used as a uniform resource locator (URL) of an AR image.

FIG. 13C illustrates a more specific example of the specific URI including the given text string of "clicker-ar" exemplified in FIG. 13B. In an example case of FIG. 13C, the text string of "<image url>" in FIG. 13B is set with a URL of "http://www.example.com/frames/jp-aaa.png" including a file path leading to a file of an AR image, in which a file of "jp-aaa.png" of the AR image can be acquired by accessing the URL of "http://www.example.com/frames/jp-aaa.png."

The URI including the text string of "click-ar" can be used as an instruction to call the AR function unit 513 in the operator terminal 50, and the text string of "clicker-ar" can be considered as a command that is instructed to the operator terminal 50. Hereinafter, the specific URI including the text string of "click-ar" used for calling the AR function unit 513 is referred to as a command URI. That is, in step S2 of FIG. 7, the command URI is associated with the answer button 4102 (i.e., determination button 410 in FIG. 7).

The description of FIG. 7 is further continued. As described above, the registration image and the attachment information are registered in the image searching system 10 in step S1, and the command URI is registered to the external service providing server 40 in step S2. The command URI is further transmitted to the external service web site 41, to be described later.

Then, in step S3, a general user captures an image of the object 51 (e.g., actual object) using the operator terminal 50, and in step S4, the operator terminal 50 transmits a search request including the captured image for requesting an image searching based on the captured image to the image searching system 10.

Further, in some cases, it can be assumed that the client prepares, for example, a print medium including the registration image of the registration object registered in the image searching system 10, and the general user captures an image of the print medium using the operator terminal 50, in which the operator terminal 50 transmits the search request including the captured image to the image searching system 10.

In response to the search request received from the operator terminal 50, the search server 11 of the image searching system 10 performs the image searching using the image search DB 12 based on the captured image included in the received search request. The search server 11 performs the image searching to extract or search a specific registration image similar to the image of the extracted object detected in the captured image from the image search DB 12, and acquires the attachment information associated with the searched specific registration image. The attachment information includes, for example, the URI of the external service web site 41 as described in step S1. Then, the image searching system 10 returns the attachment information including the URI of the external service web site 41, acquired by performing the image searching using the search server 11, to the operator terminal 50 as an image searching result (step S5).

Then, the operator terminal 50 displays a screen (e.g., screen image) used for designating the attachment information including the URI of the external service web site 41. When the general user designates the attachment information on this screen, in response to the designation operation, the operator terminal 50 accesses the external service web site 41 via the external service providing server 40 based on the URI included in the attachment information (step S6, step S7).

With this access, a screen (e.g., screen image) generated by the external service web site 41 is displayed on the display of the operator terminal 50. In response to the operation to the determination button 410 disposed on the external service web site 41, the command URL associated with the determination button 410 is transmitted to the operator terminal 50 (step S8).

In practice, when the operator terminal 50 accesses the external service web site 41 in step S6, the internal browser unit 512 of the operator terminal 50 reads out a HTML file of the external service web site 41, and also reads the command URI associated with the determination button 410. Therefore, the processing in step S8 is actually an internal processing in the internal browser unit 512.

In the operator terminal 50, the internal browser unit 512 uses the received information processing unit 5121 to analyze the command URI that is acquired in response to the operation to the determination button 410 disposed on the external service web site 41. If an analysis result indicates that the text string of "clicker-ar" is included in the command URI, the internal browser unit 512 uses the function calling unit 5122 to call the AR function unit 513. Then, the internal browser unit 512 transfers the URL including the file path of the AR image included in the query component of the command URI to the AR function unit 513.

In the operator terminal 50, the AR function unit 513 uses the AR image acquiring unit 5130 to access the client system 30 based on the URL transferred from the internal browser unit 512 (step S9).

The AR image acquiring unit 5130 acquires the AR image from the contents storage unit 32 via the client server 31 in accordance with the file path included in the URL (step S10).

In response to a user operation to the operator terminal 50, the AR function unit 513 uses the image capturing instruction unit 5131 to perform an image processing using the acquired AR image in the operator terminal 50 (step S11). For example, the image capturing instruction unit 5131 acquires the captured image output from the imaging unit 5008 at a timing corresponding to the user operation. In the AR function unit 513, the image synthesizing unit 5132 synthesizes the captured image (step S3) and the acquired AR image (step S10) to generate a synthesized image. Then, the storage processing unit 5133 stores the generated synthesized image, for example, in the storage 5004 of the operator terminal 50.

Then, the storage processing unit 5133 transmits or uploads the stored synthesized image to, for example, the SNS server 60 (step S12), allowing the synthesized image to be shared on the SNS. For example, the storage processing unit 5133 can be configured to instruct the operator terminal 50 to display a menu screen used for selecting a desired SNS from one or more SNSs, and can be configured to transmit or upload the synthesized image to the SNS server 60 on the selected SNS based on a user operation on the menu screen.

As described above in the example 1 of the first embodiment, when the operator terminal 50 transmits the search request including the captured image to the image searching system 10, the operator terminal 50 acquires the attachment information including the link destination from the image searching system 10 as a result of the image searching based on the captured image, and the link destination is associated with the command URI including the URL of the AR image. Further, in the operator terminal 50, the AR function unit 513, which performs the image processing using the AR image, is called by the internal browser unit 512 in accordance with the command URI.

Therefore, even when another a service such as a third-party system is may be connected to the image searching system 10 and the client system 30 while the image searching is performed by the image searching system 10 and the AR image is acquired from the client system 30, the cooperation between the image searching system 10 and the client system 30 can be performed.

Example 2 of First Embodiment

Hereinafter, a description is given of an example 2 of the first embodiment with reference to FIG. 14. In the example 2, the operator terminal 50 acquires the specific URI (command URI) including the given text string directly from the attachment information that is acquired as a result of image searching performed by the image searching system 10. In an example case of FIG. 14, the same reference numerals are assigned to the portions which are common to those of FIG. 7, and detailed descriptions thereof will be omitted.

Figure 14:
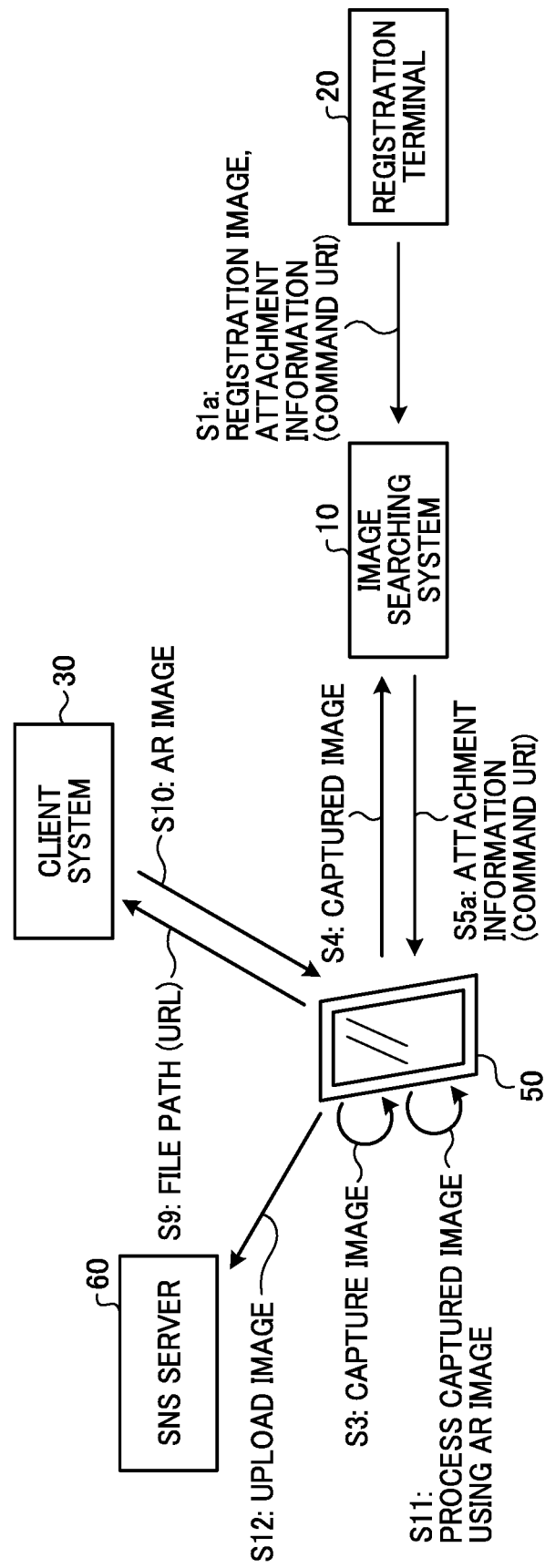
FIG. 14 illustrates a schematic diagram of processing of an example 2 of the first embodiment.

In FIG. 14, at first, the registration terminal 20 is used to register one or more registration images to be searched with respect to the captured image, and the attachment information associated with the one or more registration images (hereinafter, registration image) in the image searching system 10. Specifically, the registration terminal 20 registers the attachment information including the above described command URI, which is the link information describing the URL of the file path of the AR image file, to the image searching system 10 (step S1a).

Then, in step S3, a general user captures an image of the object 51 (e.g., actual object) using the operator terminal 50, and in step S4, the operator terminal 50 transmits a search request including the captured image for requesting an image searching based on the captured image to the image searching system 10.

In response to the search request received from the operator terminal 50, the search server 11 of the image searching system 10 performs the image searching using the image search DB 12 based on the captured image included in the received search request. As a result of the image searching performed by the image searching system 10, the search server 11 acquires the attachment information including the command URI corresponding to the captured image. In step S5a, the image searching system 10 returns the attachment information including the command URI acquired by the search server 11 as the image searching result to the operator terminal 50.

Then, the operator terminal 50 displays a screen (e.g., screen image) used for designating the attachment information including the command URI. When the general user designates the attachment information including the command URI on this screen, in response to the designation operation, the command URI included in the attachment information is transferred to the internal browser unit 512 of the operator terminal 50. The internal browser unit 512 uses the received information processing unit 5121 to analyze the command URI. If the command URI includes the text string of "clicker-ar," the AR function unit 513 is called by the function calling unit 5122. Then, the URL including the file path of the AR image file, included in the query component of the command URI, is transferred to the AR function unit 513.

Since the subsequent processing in steps S9, S10 and S12 in FIG. 14 is common to the processing described in steps S9 to S12 of FIG. 7, the description thereof is omitted.

Processing of Operator Terminal of First Embodiment

Hereinafter, a description is given of the processing of the operator terminal 50 of the first embodiment with reference to FIGS. 15 to 21.

Figure 15:
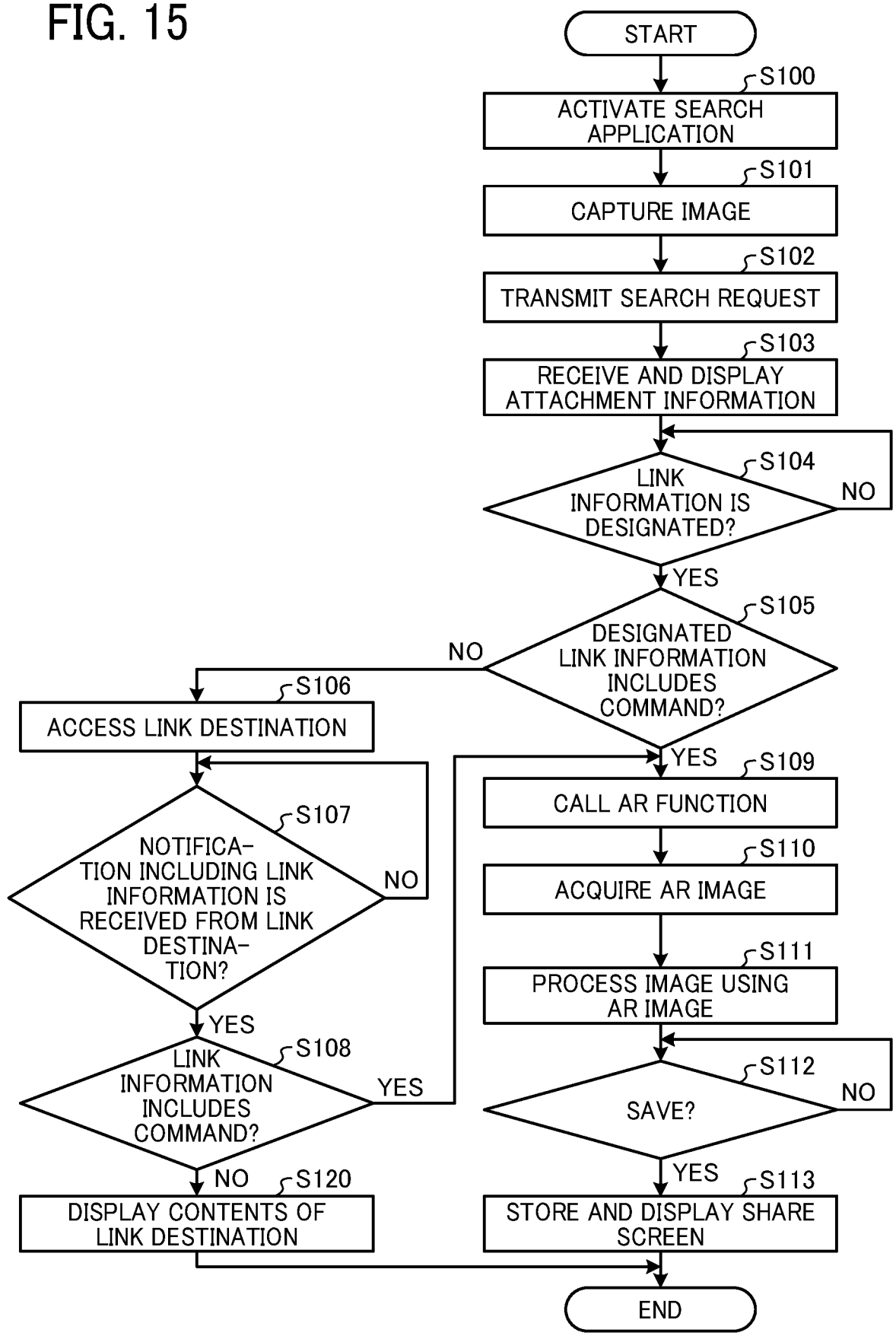
FIG. 15 illustrates an example of a flowchart showing the steps of processing of the operator terminal of the first embodiment.

FIG. 15 illustrates an example of a flowchart showing the steps of processing of the operator terminal 50 of the first embodiment. The flowchart of FIG. 15 is applied to the example 1 and the example 2 of the first embodiment.

In the following description, it is assumed that a client registers an image (registration image) in the image searching system 10, which is used to acquire a specific image (AR image) from the contents storage unit 32 storing the specific image (AR image) when the general user uses the image searching system 10. In this configuration, it is assumed that the client associates the registration image with the attachment information including at least one of the URL of the external service web site 41 (i.e., example 1) and the URL of the file path of the AR image file on the client system 30 (i.e., example 2) when registering the registration image and the attachment information to the image searching system 10. Further, it is assumed that the client prepares a print medium including the registration image registered in the image searching system 10 as a registration object, and distributes the print medium to the general user.

In step S100, the operator terminal 50 activates the search application such as the searching/imaging unit 500, for example, in response to a user operation. When the searching/imaging unit 500 is activated, for example, the operator terminal 50 displays a home screen corresponding to the search application on the display 5010.

In the following description, the processing that the searching/imaging unit 500 causes the display 5010 of the operator terminal 50 to display a screen (e.g., screen image) on the display 5010 may be simply described that the searching/imaging unit 500 displays the screen.

In step S101, in the operator terminal 50, the captured-image acquiring unit 510 of the searching/imaging unit 500 instructs the display 5010 to display a first image capture screen (FIG. 16) in response to a user operation, and then the operator terminal 50 captures an image of the object 51 using the first image capture screen. For example, the searching/imaging unit 500 performs the image capturing operation using the imaging function provided by the OS (e.g., terminal control unit 501) of the operator terminal 50. In this description, the first image capture screen is used to capture the image of the object 51.

Figure 16:
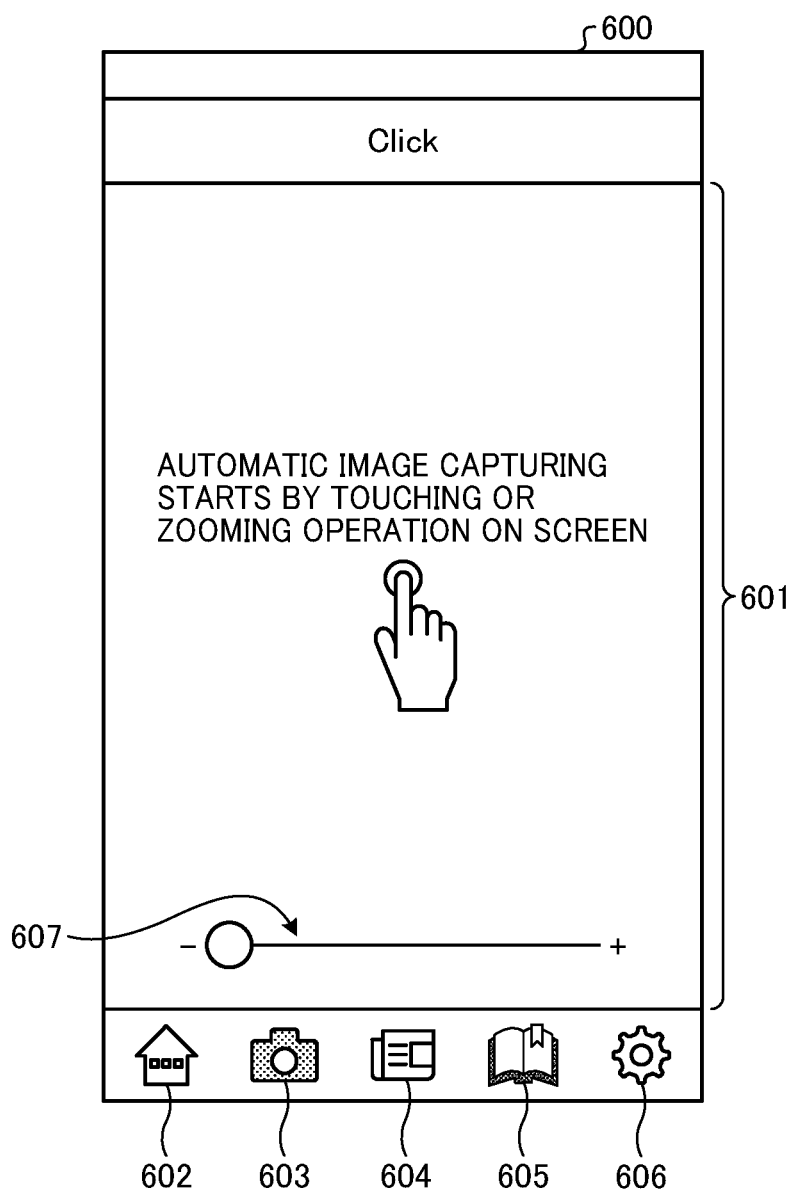
FIG. 16 illustrates an example of a first image capture screen applicable to the first embodiment.

FIG. 16 illustrates an example of the first image capture screen applicable to the first embodiment. In FIG. 16, the first image capture screen 600 includes, for example, a finder region 601, and buttons 602 to 606 used for executing each function of the searching/imaging unit 500. When the image capturing operation is performed, the finder region 601 displays an image that is output from the imaging unit 5008 as the captured image. Further, a zoom operator 607 is provided at a lower portion of the finder region 601 to adjust (e.g., enlarge or reduce) a size of an image displayed in the finder region 601. The image capturing operation is performed in response to a touch operation on the finder region 601 or an operation of the zoom operator 607. The image captured by the imaging unit 5008 is acquired by the captured-image acquiring unit 510.

After the image is captured in step S101, in step S102, the searching/imaging unit 500 uses the transmitting/receiving unit 511 to transmit a search request including the captured image, acquired by the captured-image acquiring unit 510, for requesting an image searching based on the captured image to the image searching system 10. In response to this search request, the image searching system 10 performs the image searching based on the captured image, and then transmits the attachment information corresponding to the extracted object detected in the captured image as a result of the image searching to the operator terminal 50, which is used as the transmission source of the search request.

As described above, the client associates the registration image with the attachment information including at least one of the URL of the external service web site 41 (i.e., example 1) and the URL of the file path of the AR image file on the client system 30 (i.e., example 2) when registering the registration image and the attachment information to the image searching system 10. Therefore, the attachment information transmitted as the image searching result from the image searching system 10 includes at least one of the URI of the external service web site 41 and the command URI.

Figure 17:
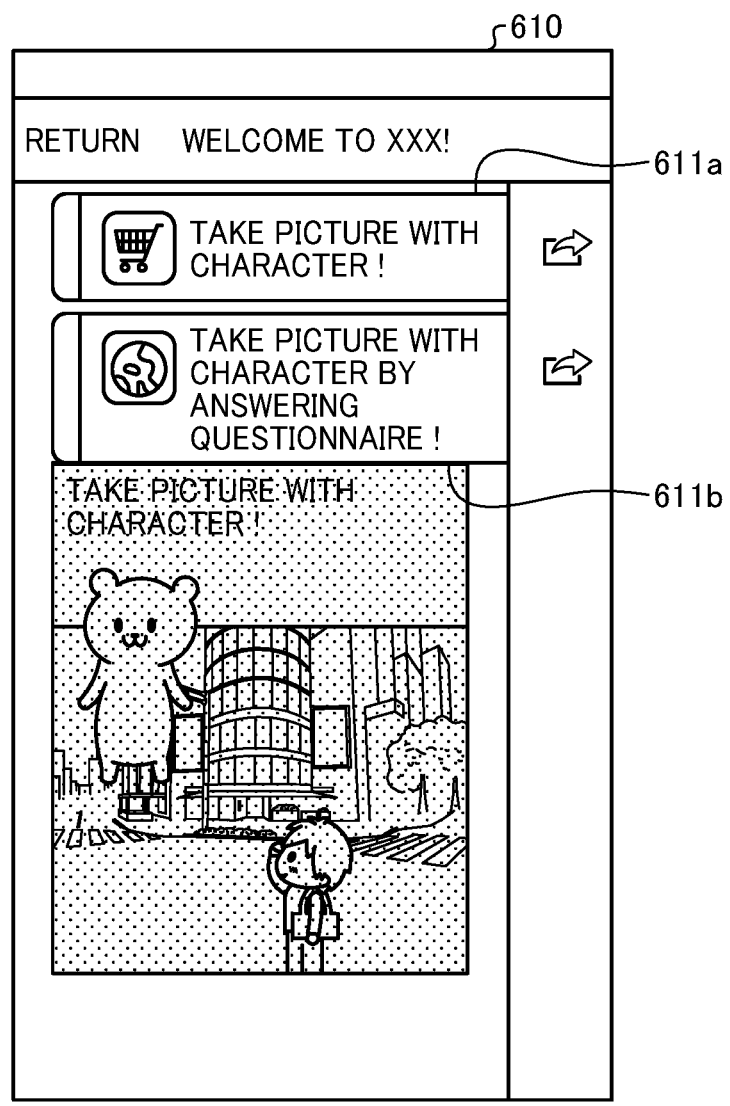
FIG. 17 illustrates an example of a menu screen based on attachment information applicable to the first embodiment.

In step S103, the transmitting/receiving unit 511 of the operator terminal 50 receives the attachment information as the image searching result, and transfers the attachment information to the internal browser unit 512. In the internal browser unit 512, the UI unit 5120 displays a menu screen based on the attachment information. FIG. 17 illustrates an example of the menu screen based on the attachment information applicable to the first embodiment. In FIG. 17, a tab 611*a* and a tab 611*b* corresponding to the link information included in the attachment information are displayed on the menu screen 610. In this example case, it is assumed that the tab 611*a* corresponds to the command URI (i.e., example 2), and the tab 611*b* corresponds to the URI of the external service web site 41 (i.e., example 1).

In step S104, the UI unit 5120 determines whether the link information indicated by the attachment information is designated. Specifically, the UI unit 5120 determines whether any one of the tabs 661*a* and 611*b* on the menu screen 610 is operated. If the UI unit 5120 determines that the link information is not designated (step S104: NO), the UI unit 5120 repeats step S104. On the other hand, if the UI unit 5120 determines that any one of the tabs 611*a* and 611*b* is operated and then the link information is designated (step S104: YES), the UI unit 5120 proceeds the sequence to step S105. The UI unit 5120 further transfers the designated link information to the received information processing unit 5121.

In step S105, the received information processing unit 5121 analyzes the link information transferred from the UI unit 5120 to determine whether the designated link information includes a command. For example, if the designated link information includes a given text string (e.g., "click-ar" in the above described example) indicating the command URI in the scheme of the URI, the received information processing unit 5121 determines that the designated link information includes the command.

If the received information processing unit 5121 determines that the designated link information includes the command (step S105: YES), the received information processing unit 5121 proceeds the sequence to step 109, to described later. On the other hand, if the received information processing unit 5121 determines that the designated link information does not include the command (step S105: NO), the received information processing unit 5121 proceeds the sequence to step S106.

In the example case of the menu screen 610 in FIG. 17, when the tab 611*a* is operated, the command URI is designated as the link information, and then it is determined that the designated link information includes the command. On the other hand, when the tab 611*b* is operated, since the designated link information is not the command URI, it is determined that the designated link information does not include the command.

In step S106, the received information processing unit 5121 accesses the link destination indicated by the URI (i.e., link information).

In step S107, the received information processing unit 5121 determines whether a notification including the link information is received from the link destination where the operator terminal 50 has accessed in step S106. If the received information processing unit 5121 determines that the notification including the link information is not received from the link destination (step S107: NO), the received information processing unit 5121 repeats step S107. On the other hand, if the received information processing unit 5121 determines that the notification including the link information is received from the link destination (step S107: YES), the received information processing unit 5121 proceeds the sequence to step S108.

For example, in step S106, the received information processing unit 5121 accesses the external service web site 41 used as the link destination identified by the URI used as the link information. When the determination button 410 is operated on the external service web site 41, the link information associated with the determination button 410 (e.g., command URI) is acquired by the received information processing unit 5121, with which it is determined that the received information processing unit 5121 has received the notification including the link information.

In step 108, the received information processing unit 5121 analyzes the acquired link information to determine whether the acquired link information includes a command as similar to step S105. If the received information processing unit 5121 determines that the designated link information does not include the command (step S108: NO), the received information processing unit 5121 proceeds the sequence to step S120. In this example case, the designated link information is a typical URI (URL), and thereby in step S120, the received information processing unit 5121 accesses the link destination in accordance with the link information, and instructs the UI unit 5120 to display the specific content acquired from the link destination, and then ends a series of processes of FIG. 15.

On the other hand, if the received information processing unit 5121 determines that the acquired link information includes the command (step S108: YES), the received information processing unit 5121 proceeds the sequence to step S109.

In step S109, the received information processing unit 5121 uses the function calling unit 5122 (i.e., second application) to call the AR function unit 513 (i.e., first application), and the received information processing unit 5121 extracts a URL of an AR image from the acquired link information, and transfers the URL of the AR image to the called AR function unit 513. Further, if the received information processing unit 5121 determines that the designated link information includes the command in step S105 (S105: YES), the sequence also proceeds to step 109.

In step S110, based on the URL set for the AR image transferred from the received information processing unit 5121, the AR image acquiring unit 5130 of the AR function unit 513 acquires the AR image from the client system 30.

Figure 18:
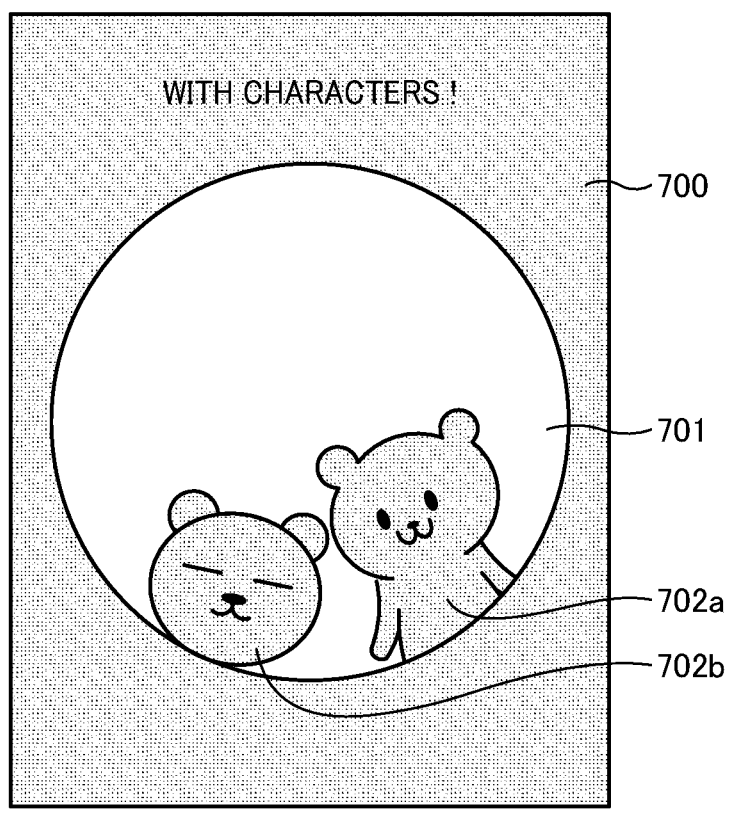
FIG. 18 illustrates an example of an AR image applicable to the first embodiment.

FIG. 18 illustrates an example of the AR image acquired from the client system 30 applicable to the first embodiment. In an example case of FIG. 18, a frame image 700 to add a frame to the captured image is used as the AR image. As illustrated in FIG. 18, the frame image 700 includes, for example, a window region 701. When the frame image 700 is synthesized with the target image (e.g., captured image captured by the imaging unit 5008), the captured image corresponding to a size of the window region 701 is displayed in the window region 701, in which a part of the captured image is seen in the window region 701 while other part of the captured image may be set under the frame image 700 and not seen.

In the example case illustrated in FIG. 18, the frame image 700 includes, for example, character images 702*a* and 702*b* representing specific characters. For example, by synthesizing the target captured image of a specific person and the window region 701 of the frame image 700 by locating the target captured image within the window region 701, a part of the target captured image of the specific person can be displayed within the frame of the frame image 700. As a result, a synthesized image of the specific person and the character images 702a and 702b can be obtained. In this description, the AR image, such as the frame image 700, is indicated with shading as illustrated in FIG. 18.

The description of FIG. 15 is further continued. After the AR image acquiring unit 5130 acquires the AR image in step S110, the sequence proceeds to step S111. In step S111, the image processing using the acquired AR image is performed.

More specifically, as described above, the UI unit 5120 generates the finder image by synthesizing the captured image output from the imaging unit 5008 (S101) and the AR image acquired by the AR image acquiring unit 5130 (S110). Then, the UI unit 5120 causes the display 5010 to display a second image capture screen (FIG. 19) including the generated finder image. In this description, the second image capture screen is used to capture the above described captured image and the AR image acquired by the AR image acquiring unit 5130 as below.

Figure 19:
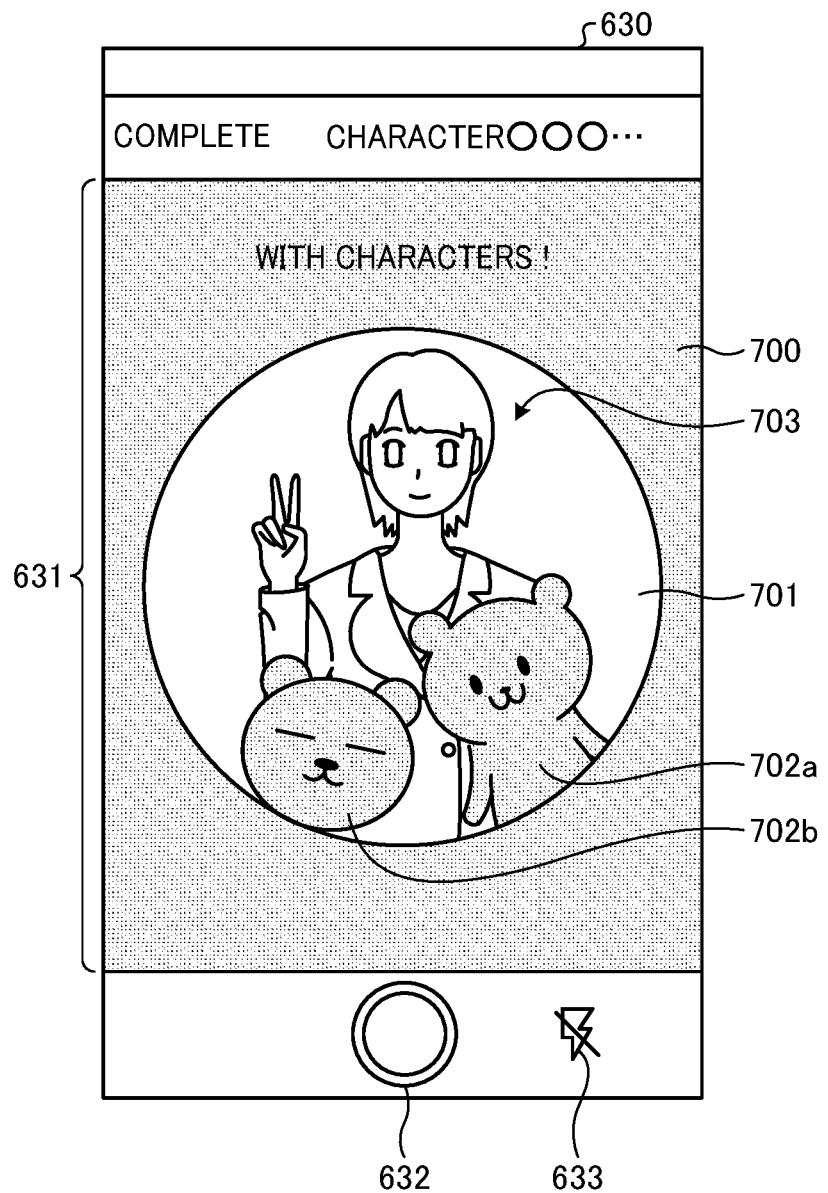
FIG. 19 illustrates an example of a second image capture screen including a finder image displayed on the operator terminal applicable to the first embodiment.

FIG. 19 illustrates an example of a second image capture screen 630 including the finder image displayed on the display 5010 of the operator terminal 50 applicable to the first embodiment. In FIG. 19, the same reference numerals are assigned to the portions which are common to those of FIG. 18, and detailed descriptions thereof will be omitted.

In FIG. 19, the second image capture screen 630 includes, for example, a finder region 631, and buttons 632 and 633. The finder region 631 displays the finder image synthesized from the captured image and the AR image. In an example case illustrated in FIG. 19, the finder image in the finder region 631 includes the frame image 700 including the character images 702a and 702b, and an image 703 output as the captured image from the imaging unit 5008 and arranged within the window region 701 of the frame image 700 while a part of the image 703 may not be seen due to the frame of the frame image 700.

The button 632 is used as a shutter button, which instructs the image capturing instruction unit 5131 to acquire the captured image, output as a movie image or a still image from the imaging unit 5008. The button 633 is used for turning on and off a flash function provided for the operator terminal 50.

When the UI unit 5120 receives an operation performed on the button 632 (i.e., shutter button), the UI unit 5120 notifies the image capturing instruction unit 5131 and the image synthesizing unit 5132 that the shutter operation is performed. In response to the notification of the shutter operation, the image capturing instruction unit 5131 instructs the imaging unit 5008 to process the image 703 and the AR image (e.g., frame image 700 including the character images 702a and 702b). As described in step S111 (FIG. 15), in response to the operation performed on the button 632, the image synthesizing unit 5132 synthesizes the captured image and the AR image acquired by the AR image acquiring unit 5130 in step S110 (FIG. 15) to generate the synthesized image.

Figure 20:
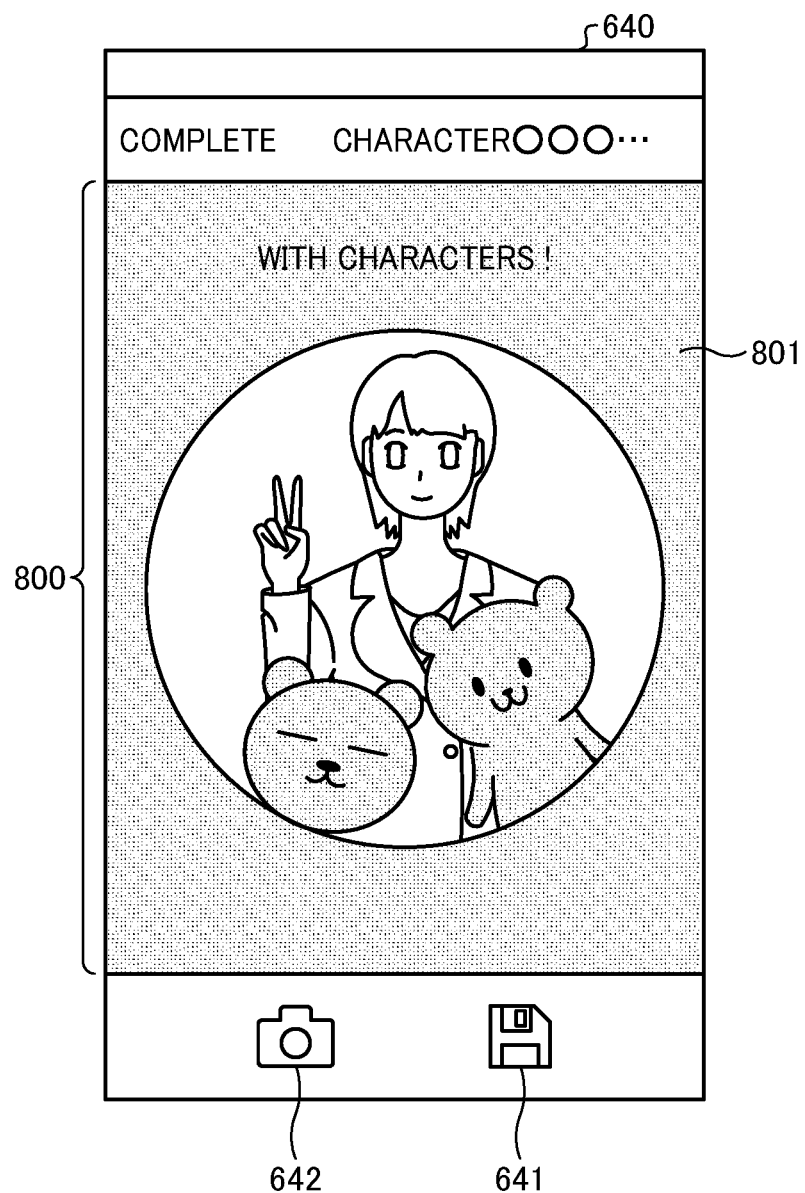
FIG. 20 illustrates an example of a save screen applicable to the first embodiment.

In step S112, in the AR function unit 513, the storage processing unit 5133 uses the UI unit 5120 to display a save screen, and then determines whether the synthesized image generated in step S111 is to be saved depending on an operation performed on the save screen. FIG. 20 illustrates an example of a save screen 640 applicable to the first embodiment. In FIG. 20, the save screen 640 includes, for example, a preview region 800, and buttons 641 and 642. The save screen 640 is displayed in response to the operation to the button 632, which is the shutter button included in the second image capture screen 630 (see FIG. 19).

The preview region 800 displays the synthesized image 801 generated in step S111. The button 641 is used for storing or saving the synthesized image 801 displayed in the preview region 800. The button 642 is used to acquire another synthesized image without saving the synthesized image 801. That is, if the button 641 is operated, the storage processing unit 5133 determines that the synthesized image 801 is to be saved or stored, and if the button 642 is operated, the storage processing unit 5133 determines that the synthesized image 801 is not saved or stored.

If the storage processing unit 5133 determines that the synthesized image 801 is not saved in response to the operation performed on the button 642 (step S112: NO), the storage processing unit 5133 repeats step S112. On the other hand, if the storage processing unit 5133 determines that the synthesized image 801 is saved in response to the operation performed on the button 641 (step S112: YES), the storage processing unit 5133 proceeds the sequence to step S113.

In step S113, the storage processing unit 5133 stores the synthesized image 801, for example, in the storage 5004 of the operator terminal 50. In addition, the storage processing unit 5133 uses the UI unit 5120 to display a share screen used for sharing the synthesized image 801 on the network 1.

Figure 21:
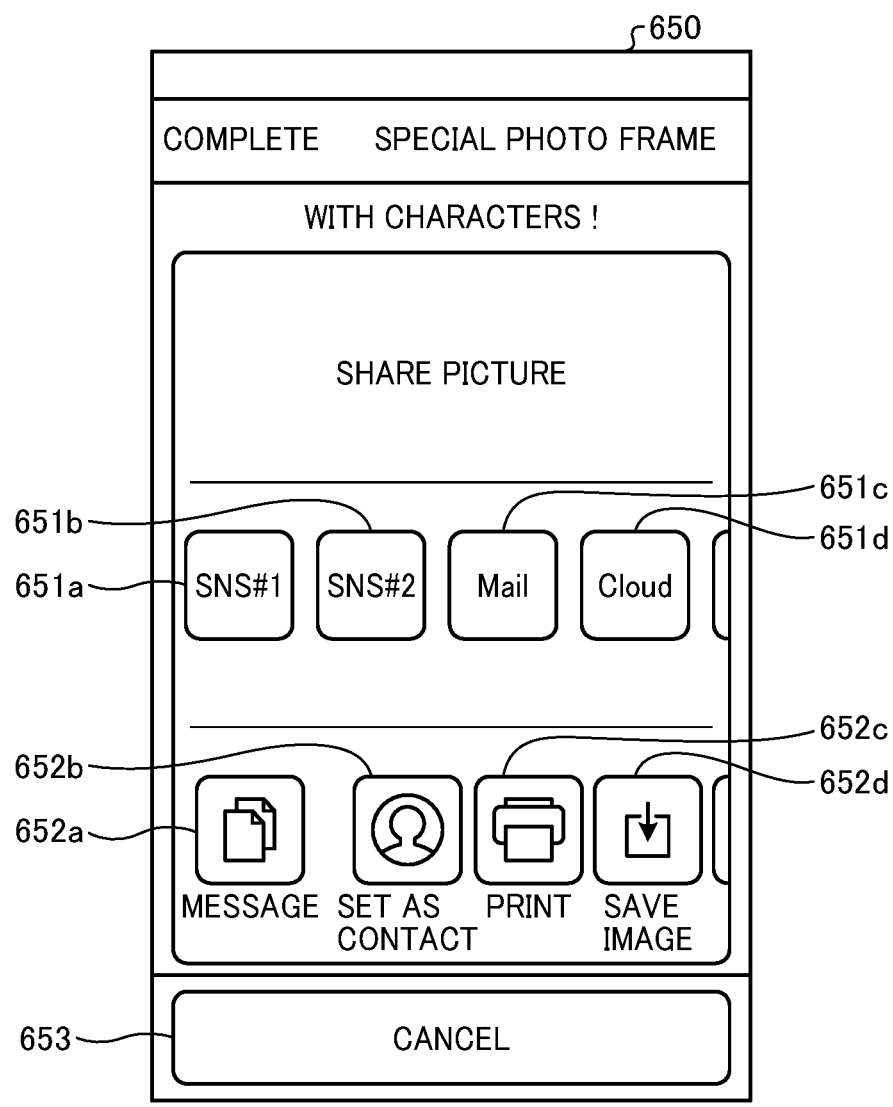
FIG. 21 illustrates an example of a share screen applicable to the first embodiment.

FIG. 21 illustrates an example of a share screen 650 applicable to the first embodiment. In FIG. 21, the share screen 650 includes, for example, buttons 651a to 651d used for sharing the synthesized image 801 on the network 1, buttons 652a to 652d used for instructing other processing (e.g., copying, printing) for the synthesized image 801, and a button 653 used for canceling the share screen 650.

In an example case of FIG. 21, the buttons 651a to 651d are used for designating a share destination or a method for sharing the synthesized image 801, and the buttons 651a and 651b are used for designating a share destination of the synthesized image 801 to SNS #1 or SNS #2. The button 651c is used for transmitting the synthesized image 801 to the designated destination using e-mail. The button 651d is used for sharing the synthesized image 801 on a cloud network.

For example, the storage processing unit 5133 transmits the synthesized image 801 to the server (e.g., SNS server 60) of the SNS #1 in response to the designation of the button 651a by a user operation. In the SNS #1, the synthesized image 801 transmitted from the operator terminal 50 is displayed along the time line provided by the SNS #1, and the synthesized image 801 is open to public along the time line. In some SNS, a hash tag, such as a search keyword, can be added to information to be shared. In this case, the storage processing unit 5133 can transmit a pre-set keyword or a keyword based on a user input as the hash tag to the server of the SNS in association with the synthesized image 801

The functions performed by the buttons 651a to 651d and 652a to 652d of the share screen 650 are provided by the OS of the operator terminal 50. For example, each sharing destination designated by each of the buttons 651a to 651d is a service having an account registered at the operator terminal 50.

When the saving and sharing of the synthesized image 801 in step S113 is completed, the series of processes of FIG. 15 is completed.

As to the above described first embodiment, the command URI used for calling the AR function unit 513 can be acquired via the external service web site 41 based on the attachment information as indicated in the example 1, or can be acquired directly from the attachment information as indicated in the example 2, in which the same processing can be used. Therefore, the cooperation between different systems can be handled more flexibly.

Examples of AR Image of First Embodiment

In the above description, the frame image 700 including the window region 701 and the character images 702a and 702b is described as the AR image, but the AR image applicable to the first embodiment is not limited thereto. Hereinafter, a description is given of examples of the AR image applicable in the first embodiment with reference to FIGS. 22 to 26.

Figure 22A:
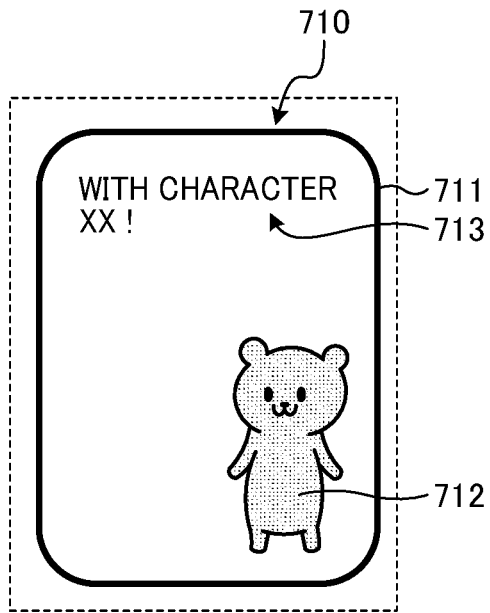
FIGS. 22A and 22B illustrate an example of an AR image applicable to the first embodiment.
Figure 22B:
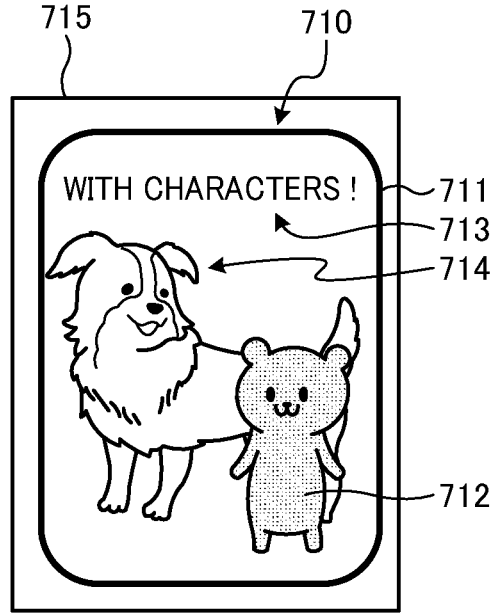

FIG. 22A illustrates an example of an AR image 710 including a frame image 711, a character image 712, and a text image 713. FIG. 22B illustrates an example of a synthesized image 715, in which a captured image 714 is synthesized with the AR image 710 illustrated in FIG. 22A. In an example case of FIG. 22B, the synthesized image 715 is generated by synthesizing the captured image 714 with the frame image 711, the character image 712, and the text image 713. Compared to the synthesized image 801 of FIG. 20, the ratio of the captured image 714 is increased in the synthesized image 715 illustrated in FIG. 22B.

Figure 23A:
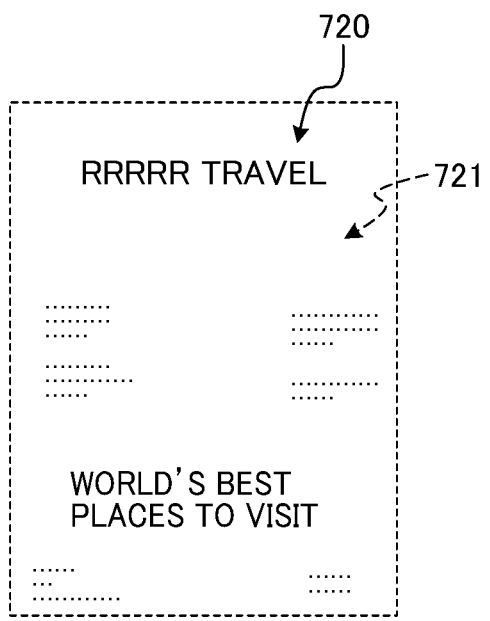
FIGS. 23A and 23B illustrate another example of an AR image applicable to the first embodiment.
Figure 23B:
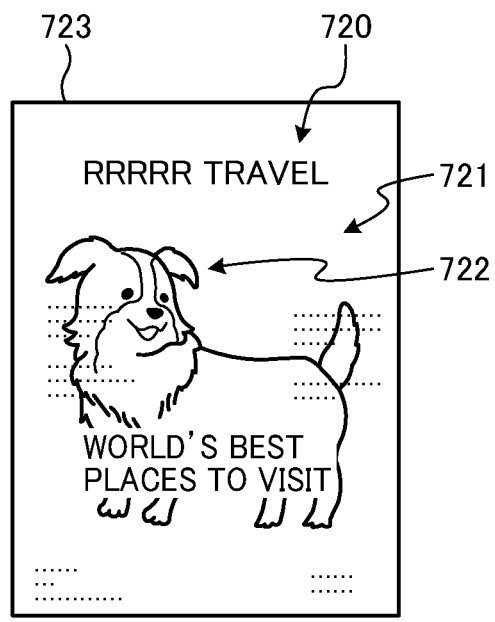

FIG. 23A illustrates an example of an AR image 720 including a plurality of text images 721. FIG. 23B illustrates an example of a synthesized image 723, in which a captured image 722 is synthesized with the AR image 720 illustrated in FIG. 23A. In an example case of FIG. 23B, the synthesized image 723 is generated by synthesizing the captured image 722 and the plurality of text images 721. The synthesized image 723 illustrated in FIG. 23B can include more messages for the captured image 722.

Figure 24A:
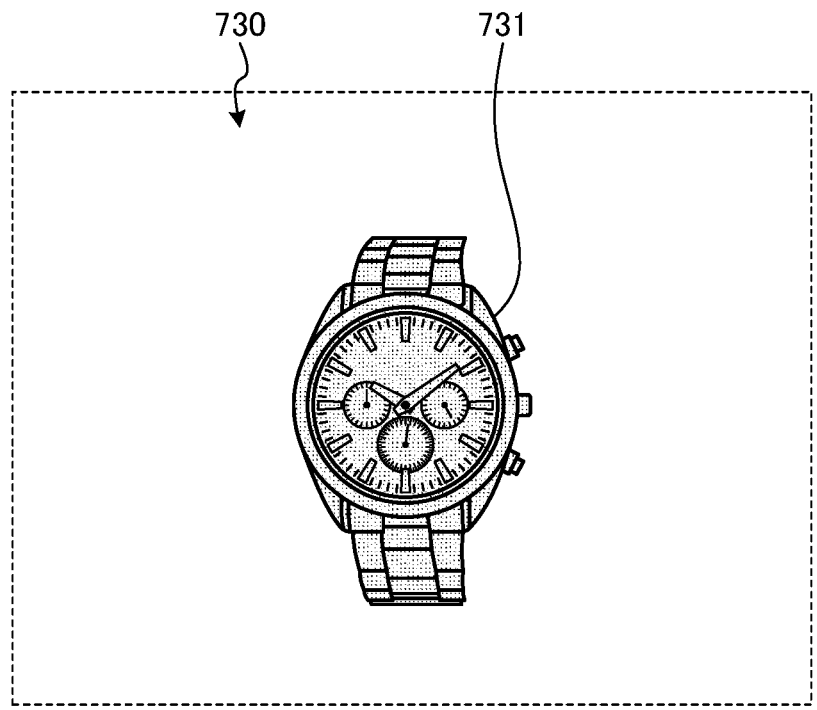
FIGS. 24A and 24B illustrate another example of an AR image applicable to the first embodiment.
Figure 24B:
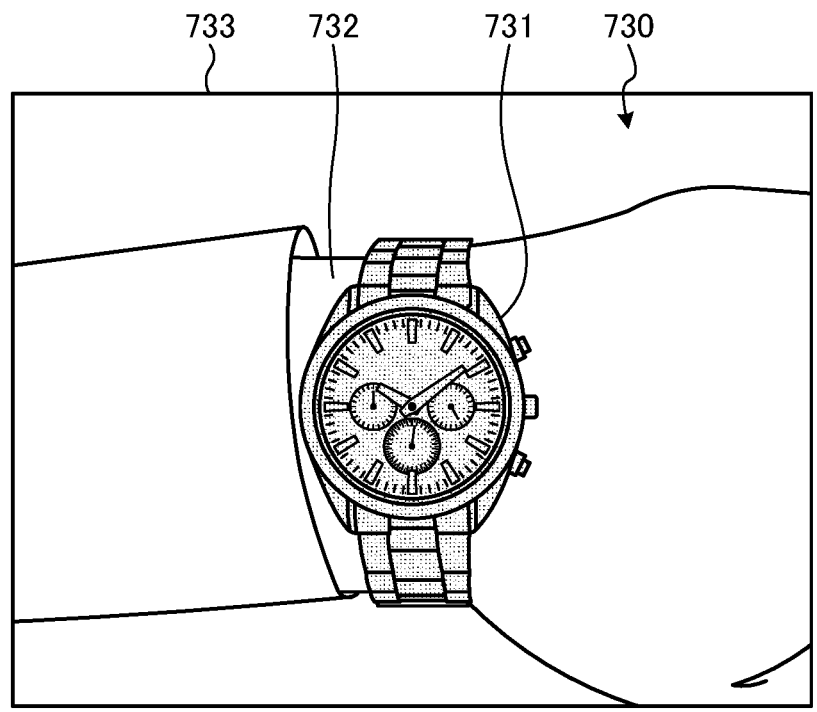

FIG. 24A illustrates an example of an AR image 730 including a product image 731. In an example case of FIG. 24A, an image of a wristwatch is used as the product image 731. FIG. 24B illustrates an example of a synthesized image 733, in which a captured image 732 including a wrist is synthesized with the AR image 730 illustrated in FIG. 24A, In an example case of FIG. 24B, the synthesized image 733 is generated by synthesizing an image of a wrist of a person (user) included in the captured image 732 and the product image 731, with which an image that the person appears to put on the wristwatch on the wrist is generated. With this processing, the user can easily check the wearing appearance of the product when the user puts on the product.

Figure 25A:
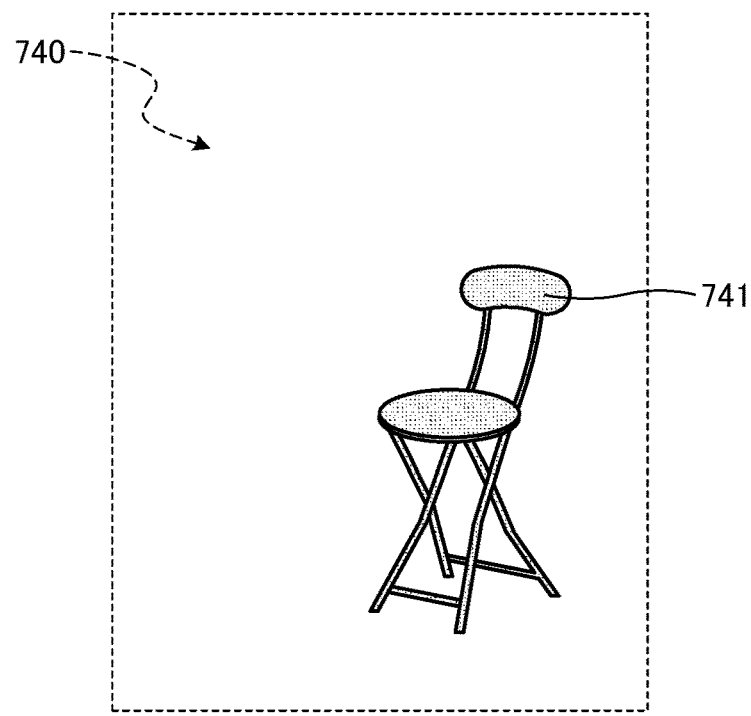
FIGS. 25A and 25B illustrate another example of an AR image applicable to the first embodiment.
Figure 25B:
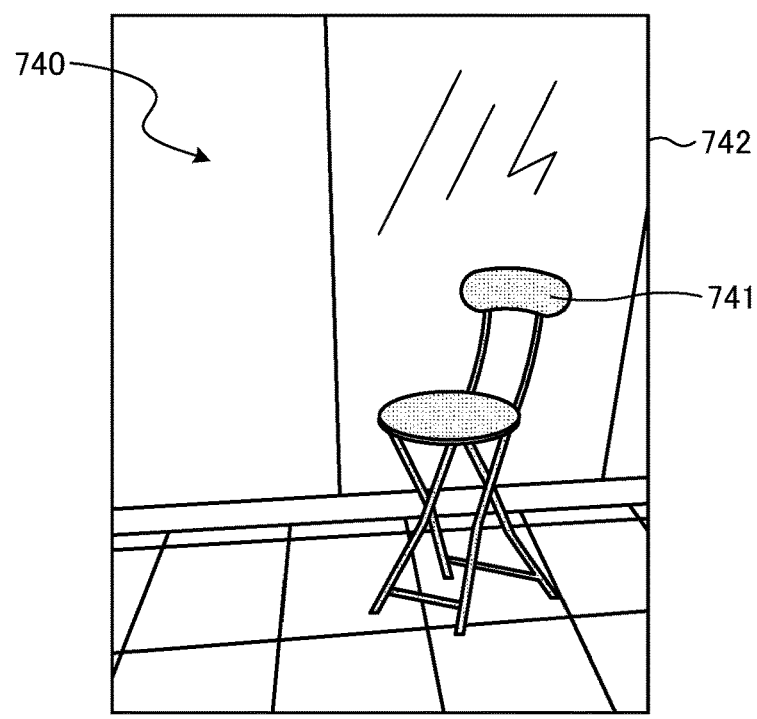

FIG. 25A illustrates an example of an AR image 740 including a product image 741 of a relatively large product. In an example case of FIG. 25A, an image of a chair is used as the product image 741. FIG. 25B illustrates an example of a synthesized image 742, in which a captured image (e.g., an image of a room) is synthesized with the AR image 740 illustrated in FIG. 25A. In an example case of FIG. 25B, the captured image is an image of a corner of a room where the chair is to be placed, and the synthesized image 742 is generated by synthesizing the image of the room and the product image 741, with which an image that appears to place the chair in a desired position is generated. With this processing, the user can easily check the placement condition when a relatively large product is placed.

Figure 26A:
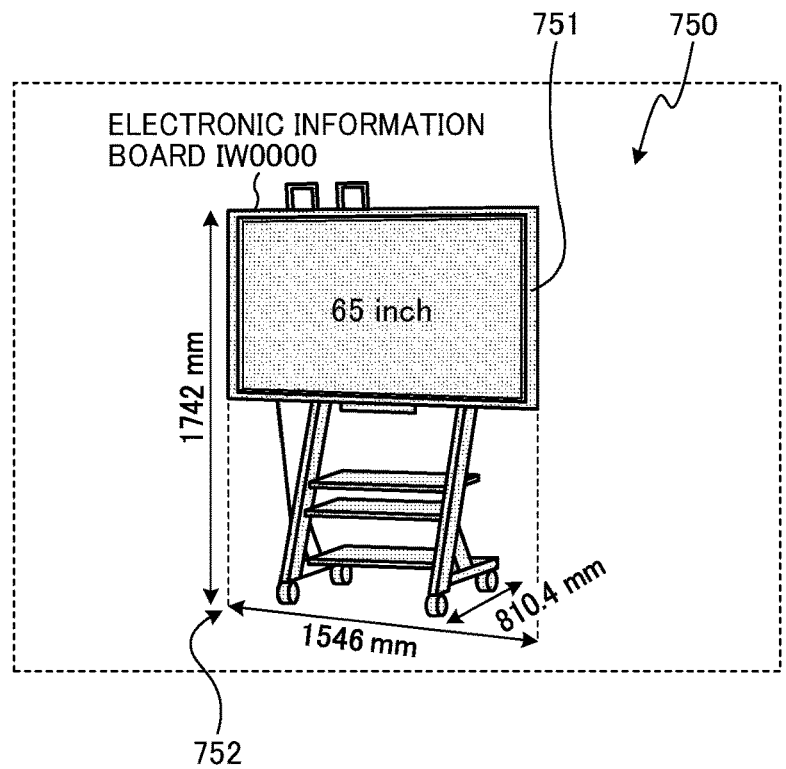
FIGS. 26A and 26B illustrate another example of an AR image applicable to the first embodiment.
Figure 26B:
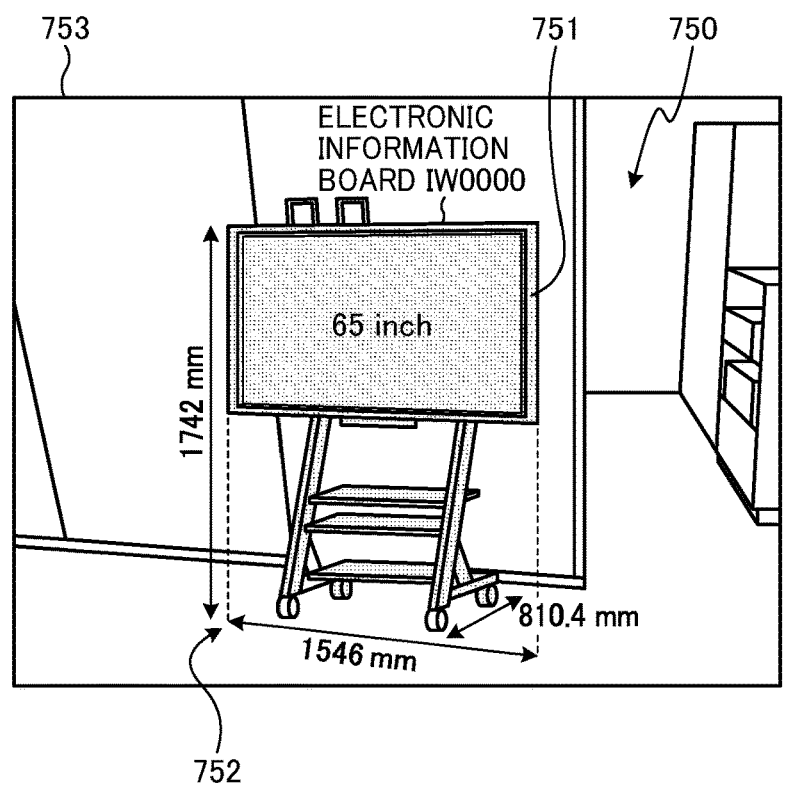

FIG. 26A illustrates an example of an AR image 750 including a product image 751 of a larger product (e.g., furniture, utensil) larger than the product illustrated in FIG. 25. In an example case of FIG. 26A, the AR image 750 includes an image of an electronic information board as the product image 751, and a scale information image 752 indicating a scale of each part of the electronic information board in the product image 751. FIG. 26B illustrates an example of a synthesized image 753, in which a captured image (e.g., an image of a room) is synthesized with the AR image 750 illustrated in FIG. 26A. In an example case of FIG. 26B, the captured image is an image of a corner of a room where the electronic information hoard is to be arranged, and the synthesized image 753 is generated by synthesizing the image of the room and the product image 751 and the scale information image 752, with which an image that appears to place the electronic information board in a desired position is generated. Since the synthesized image 753 includes the scale information image 752 indicating the scale of each part of the electronic information board, the user can easily check the placement condition when the larger product is placed.

Access Restriction to AR Function Unit of First Embodiment

In the first embodiment, the AR function unit 513 (e.g., first application) is activated in response to the calling only from the internal browser unit 512 (e.g., second application). The AR function unit 513 is configured not to receive an access from other application programs installed in the operator terminal 50 (e.g., general-purpose browser application program installed in accordance with the OS of the operator terminal 50). The internal browser unit 512 is also configured not to receive an access from other application programs except the AR function unit 513.

In the above described first embodiment, the internal browser unit 512 calls the AR function unit 513 in accordance with the URI such as the command URI. By configuring the internal browser unit 512 and the AR function unit 513 not to receive the access from other application programs, for example, a situation that the function of the AR function unit 513 alone is used from other application programs can be avoided.

That is, a service provider of the image search service can collect fees (e.g., money) corresponding to the registration image and the attachment information registered by a client in the image searching system 10. Further, the client provides the AR image managed by the client in accordance with the URI (command URI), which is acquired from the attachment information that is acquired as a result of the image searching of the registration images registered in the image searching system 10, with which the AR function unit 513 performs the image processing using the AR images. If the URI of the AR image can be acquired using other application programs and the AR function unit 513 can be accessed from the other application programs, the service provider cannot collect the fees (e.g., money) and the service cannot be provided from the client. As described above, this issue can be avoided by restricting the access to the internal browser unit 512 and the AR function unit 513.

Although it is described that the URI is included in the attachment information to be registered in the image searching system 10, information included in the attachment information is not limited thereto, but other types of information can be included in the attachment information.

For example, information indicating a time range can be included in the attachment information. In this case, the received information processing unit 5121 acquires time information when the operator terminal 50 acquires the attachment information from the location information acquiring unit 506, and can execute subsequent processing (e.g., step S6 and subsequent steps in FIG. 7) when the acquired time information is within the time range included in the attachment information.

Similarly, location information indicating a given location range can be included in the attachment information. In this case, the received information processing unit 5121 acquires location information where the operator terminal 50 acquires the attachment information from the location information acquiring unit 506, and can execute the subsequent processing when the acquired location information is within the given location range included in the attachment information.

In the above described example 1 of the first embodiment, the operator terminal 50 acquires the specific URI including the given text string from the external service web site 41 provided by the external service providing server 40 based on the attachment information acquired as a result of the image searching, and then calls the AR function unit 513. In the above described example 2 of the first embodiment, the operator terminal 50 acquires the specific URI including the given text string directly from the attachment information acquired as a result of the image searching, and then calls the AR function unit 513. Therefore, as indicated in the example 1 and example 2 of the first embodiment, the given text string included in the specific URI is used as the text string for designating a given function (i.e., calling the AR function unit 513) in a process of an enhanced information service that is provided based on the attachment information.

First Variant Example of First Embodiment

Hereinafter, a description is given of a first variant example of the first embodiment with reference to reference to FIGS. 27 and 28. In the above described example 1 of the first embodiment, when acquiring the command URI from the external service web site 41, the URI including the given text string of "click-ar" as the scheme is associated with the determination button 410 of the external service web site 41 (step S2 in FIG. 7). However, depending on design specifications of the external service providing server 40, the URI associated with the determination button 410 is restricted, and the URI including the given text string of "click-ar" as the scheme cannot be set in some cases.

The first variant example of the first embodiment employs a redirect method using a dummy site on the web site to cope with the setting restriction of the URI by the external service providing server 40. Specifically, a service provider has a URI, which can be associated with the determination button 410 in the external service providing server 40, as an address, and prepares a web site capable of receiving and transferring the command URI as the dummy site, and associates a URI of the dummy site with the determination button 410. With this configuration, the redirect to the command URI from the external service web site 41, not corresponding to the command URI, can be implemented.

The dummy site may be provided by the client or the service provider. Further, the web server to which the dummy site is provided is not particularly limited if the web server is accessible from the operator terminal 50.

Hereinafter, a description is given of a method of transferring the command URI using the redirect method of the first variant example of the first embodiment with reference to FIGS. 27 and 28.

The redirect method can use known methods, such as a method using a meta tag "<META>" of HTML, a method of using script, and a method using a web server. Hereinafter, the method of using the meta tag "<META>" of HTML is described.

At first, the service provider installs a dummy site 33 on a web site connected to the network 1. The dummy site 33 is a web site set with a URL including a text string of "http" indicating HTTP or "https" used as the scheme as an address. The URL of the dummy site 33 is associated with the determination button 410 of the external service web site 41.

Further, a meta tag defined by tag "<META>" is described between the tag "<HEAD>" and "</HEAD>" indicating the header in the description of the HTML file describing the dummy site 33.

FIG. 28 illustrates an example of the meta tag used in the first variant example of the first embodiment. In the meta tag illustrated in FIG. 28, a value "Refresh" indicating an automatic jump to another web page is described as a parameter of "HTTP-EQUIV." In the meta tag, a value of the automatic jump is described in a parameter of "CONTENT." As a value for the automatic jump by the parameter of "CONTENT," the time to shift to the automatic jump and the URI of the automatic jump destination are described.

In this example case of FIG. 28, the time to shift to the automatic jump is set "0." Therefore, when the internal browser unit 512 reads the dummy site 33, the web page is immediately shifted to the URI designated as the automatic jump destination. Further, a command URI is described as a URI of the automatic jump destination. In the example case of FIG. 28, the URI indicating the automatic jump destination is described with the command URI of "clicker-ar:// image?url=http://www.example.com/frames/jp-aaa.png" setting the given text string of "clicker-ar" as the scheme, which is described with reference to FIGS. 13B and 13C.

Figure 27:
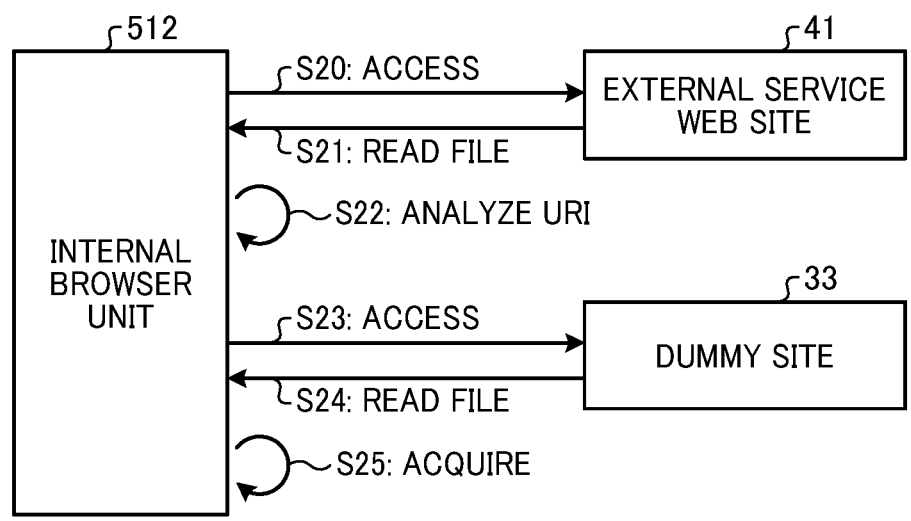
FIG. 27 illustrates a method of transferring a command URI using a redirect method of a first variant example of the first embodiment.

The description of FIG. 27 is further continued. For example, the internal browser unit 512 analyzes the URI associated with the tab 611b in response to the operation of the tab 611b in FIG. 17.

The internal browser unit 512 accesses the external service web site 41 based on an analysis result of the URI (step S20), and reads out a HTML file configuring the external service web site 41 (step S21).

The internal browser unit 512 analyzes the URI associated with the determination button 410 in response to the operation of the determination button 410 provided on the external service web site 41 (step S22).

The internal browser unit 512 accesses the dummy site 33 based on an analysis result of the URI (step S23), and reads out a HTML file configuring the dummy site 33 (step S24).

The internal browser unit 512 analyzes the meta tag (see FIG. 28) described in the header of the HTML file of the dummy site 33. Based on an analysis result of the meta tag, the internal browser unit 512 extracts the value of "Refresh" included in the parameter of "HTTP-EQUIV" and the value of the parameter of "CONTENT." The internal browser unit 512 extracts and analyzes the URI (command URI) from the value of the parameter of "CONTENT" to access the automatic jump destination based on the value of "Refresh." As a result, the internal browser unit 512 acquires the text string of "clicker-ar" set as the scheme in the command URI, and the URL of the AR image (step S25). Then, the internal browser unit 512 calls the AR function unit 513 based on the acquired text string of "click-ar," and transfers the URL of the AR image to the called AR function unit 513.

As described above, even if the external service providing server 40 does not allow the setting of the command URI to the determination button 410 of the external service web site 41, the command URI can be returned to the internal browser unit 512 based on the URI included in the attachment information.

Second Variant Example of First Embodiment

Figure 29:
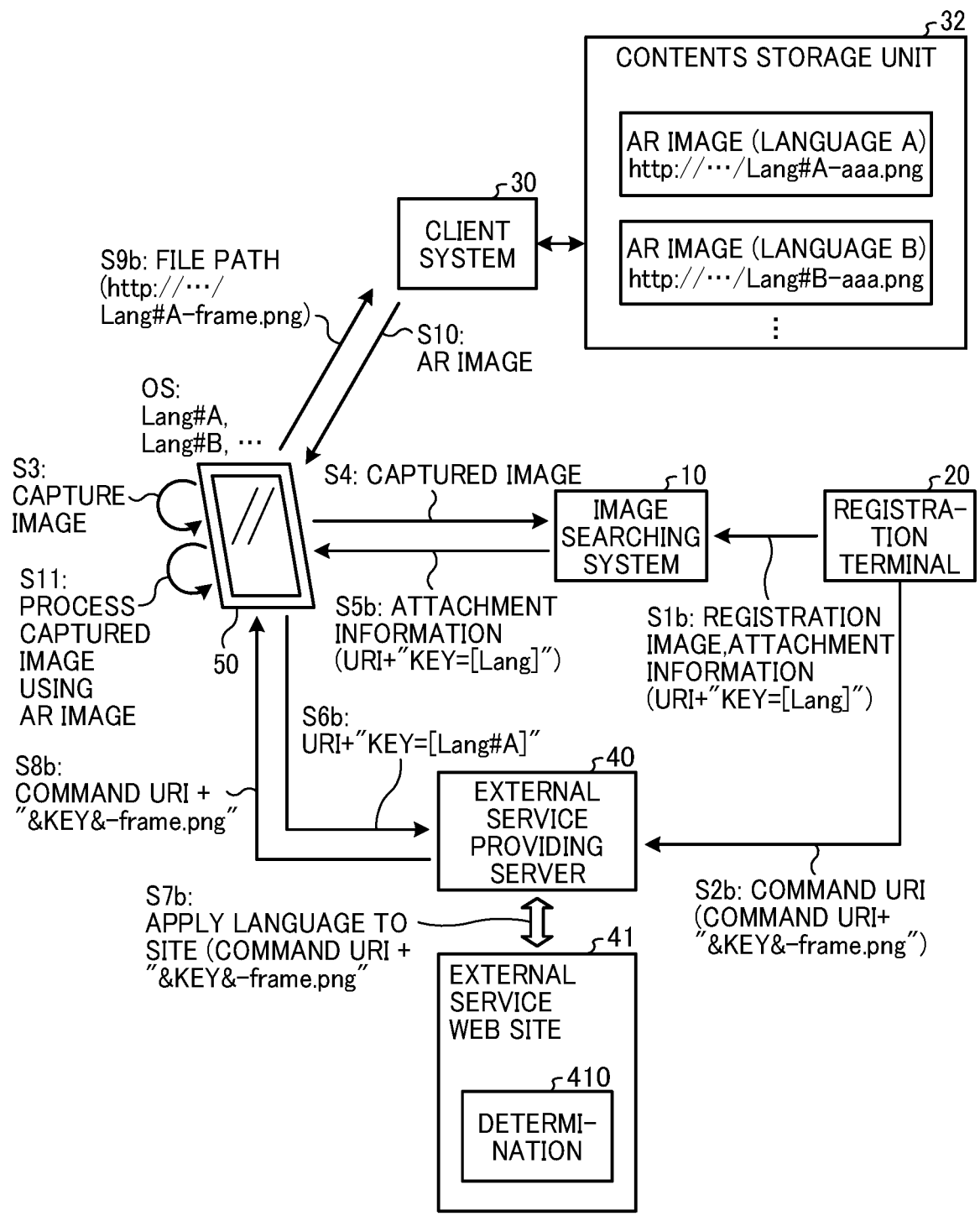
FIG. 29 illustrates a schematic diagram of processing of a second variant example of the first embodiment.

Hereinafter, a description is given of a second variant example of the first embodiment with reference to FIG. 29. In the second variant example of the first embodiment, the operator terminal 50 can acquire an AR image corresponding to a language set for the OS of the operator terminal 50. Hereinafter, a description is given of applying the second variant example of the first embodiment to the example 1 of the first embodiment (i.e., acquiring the command URI from the external service web site 41) with reference to FIG. 29. In FIG. 29, the same reference numerals are assigned to the portions which are common to those of FIG. 7, and detailed descriptions thereof will be omitted.

If a language is designated when the external service providing server 40 accesses the external service web site 41, the external service providing server 40 can switch the display language of the external service web site 41 in accordance with the designated language.

Prior to the processing illustrated in FIG. 29, a plurality of AR images corresponding to different languages used for one images searching result, to be performed by the image searching system 10, is stored in the contents storage unit 32 of the client system 30. In an example case of FIG. 29, the contents storage unit 32 stores the AR image for language A, the AR image for language B, and so on, which are the same AR image except the languages. In this configuration, each AR image is stored in the contents storage unit 32 using a file having a file name including a value indicating the corresponding language. The file name may include, for example, a part common to each language, and a language display part indicating each language.

In the example case of FIG. 29, the file name is composed of the common part of "frame.png" including an extension indicating a file format, and the language display part of "Lang #A" or "Lang #B" indicating each language, which are combined using a hyphen "-." For example, when the language display part is set with "JP" indicating Japanese, the language display part is set with "EN" indicating English, the language display part is set with "CN" indicating Chinese, and the common part is set with "frame.png", the file name of the AR image corresponding to Japanese becomes "JP-frame.png," the file name of the AR image corresponding to English becomes "EN-frame.png," and the file name of the AR image corresponding to Chinese becomes "CN-frame.png." By setting the rule of file name as described above, the AR image corresponding to each language can be designated by simply replacing the language display part.

It is preferable that the language description in the language display part of "Lang #A" and "Lang #B" corresponds to the description used by the external service providing server 40 when the language is designated.

Hereinafter, a description is given of FIG. 29 by comparing with FIG. 7. At first, the registration terminal 20 is used to register the registration image to be searched with respect to the captured image, and the attachment information associated with the registration image in the image searching system 10 (step S1b). In step S1b, the attachment information includes a URI and a keyword indicating a language designation as a parameter of the URI to be used for acquiring an AR image. In this example case of FIG. 29, the parameter of "KEY=[Lang]" indicates that the keyword of "KEY" is replaced with a text string described as the value of "Lang."

Further, for example, the registration terminal 20 designates and transmits the command URI to be associated with the determination button 410 of the external service web site 41, to the external service providing server 40 (step S2b). The command URI includes a URL of an AR image file, and the keyword of "KEY" is applied to the language display part in the AR image file name included in the URL ("&KEY&-frame.png").

After completing the registration at the image searching system 10 and the external service providing server 40 in step S1b and step S2b, in step S3, a general user captures an image of the object 51 (e.g., actual object) using the operator terminal 50, and in step S4, the operator terminal 50 transmits a search request including the captured image for requesting an image searching based on the captured image to the image searching system 10.

The image searching system 10 performs the image searching in response to the search request received from the operator terminal 50, and acquires the attachment information corresponding to the captured image included in the search request. In this example case, the attachment information includes the URI of the external service web site 41, and the parameter of "KEY=[Lang]." The image searching system 10 returns the attachment information including the URI and the parameter of "KEY=[Lang]" to the operator terminal 50 (step S5b).

Then, the operator terminal 50 displays a screen (e.g., screen image) for designating the attachment information including the URI of the external service web site 41 on the display of the operator terminal 50. Then, in response to an operation of designating the attachment information on the screen, the operator terminal 50 accesses the external service providing server 40 in accordance with the URI included in the attachment information, and further accesses the external service web site 41 via the external service providing server 40 (steps S6b and S7b).

In step S6b, the operator terminal 50 replaces the value of "Lang" in the parameter of "KEYILand" included in the URI with a value of an identifier indicating a specific language currently set in the operator terminal 50 (e.g., a value of "Lang #A" in FIG. 29), and then the operator terminal 50 accesses the external service providing server 40. Then, the external service providing server 40 extracts the value of "Lang #A" based on the keyword "KEY" included in the URI, which is used when the operator terminal 50 have accessed the external service providing server 40. As a result, the external service providing server 40 switches the display language of the external service web site 41 to the display language indicated by the value of "Lang #A."

Further, the external service providing server 40 replaces the "&KEY&" portion in the file name of "&KEY&-frame.png" included in the command URI associated with the determination button 410 of the external service web site 41 with the extracted value of "Lang #A." Then, the operator terminal 50 accesses the external service web site 41 applying the value of "Lang #A" to the determination button 410 (step S7b).

With this access, a screen (e.g., screen image) generated by the external service web site 41 is displayed on the display of the operator terminal 50. In response to an operation to the determination button 410 disposed on the external service web site 41, the command URI including the file name of "&KEY&-frame.png" associated with the determination button 410 is transmitted to the operator terminal 50 (step S8b).

Then, in the operator terminal 50, the internal browser unit 512 analyzes the command URI acquired in step S8b using the received information processing unit 5121, replaces the file name of "&KEY&-frame.png" included in the command URI with the value of "Lang #A" indicating the language set by the OS installed in the operator terminal 50 to set the file name of "Lang #A-frame.png." Further, when an analysis result of the command URI indicates that the command URI includes the given text string of "clicker-ar," the received information processing unit 5121 uses the function calling unit 5122 to call the AR function unit 513. Then, the internal browser unit 512 transfers the URL including the file path of the AR image included in the query component of the command URI to the AR function unit 513. In this example case of FIG. 29, the file path of the AR image includes the file name of "Lang #A-frame.png."

In the operator terminal 50, the AR function unit 513 uses the AR image acquiring unit 5130 to access the client system 30 in accordance with the URL including the file name of "Lang #A-frame.png" transferred from the internal browser unit 512 (step S9b).

In accordance with the file path, the AR image acquiring unit 5130 acquires the AR image including the language display part of "Lang #A" from the contents storage unit 32 via the client server 31 (step S10).

Figure 30:
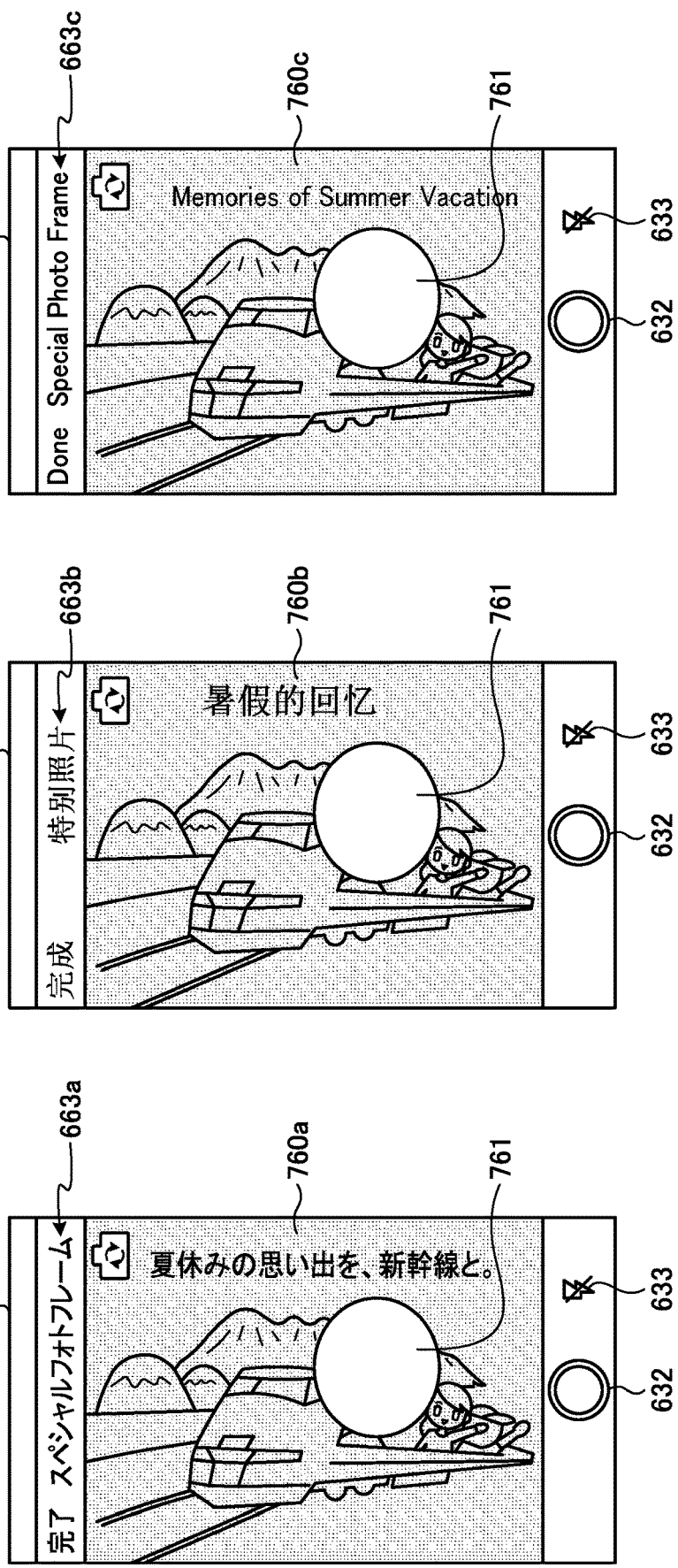
FIGS. 30A, 30B, and 30C illustrate another examples of a second image capture screen displaying an AR image acquired in accordance with setting languages in the second variant example of the first embodiment.

FIG. 30 illustrates another example of the second image capture screen displaying an AR image acquired in accordance with the language settings as described above for the operator terminal 50, set with each language by the OS in the second variant example of the first embodiment. FIG. 30A illustrates an example of a second image capture screen 660a when Japanese is set as the language of the operator terminal 50. FIG. 30B illustrates an example of a second image capture screen 660b when Chinese is set as the language of the operator terminal 50. FIG. 30C illustrates an example of a second image capture screen 660c when English is set as the language of the operator terminal 50. In FIGS. 30A, 30B, and 30C, AR images 760a, 760b, and 760c are respectively corresponding to each language frame image including a window region 761.

In an example case of FIG. 30A, the second image capture screen 660a is used for the operator terminal 50 setting Japanese as the language based on the OS, and thereby a title region 663a uses Japanese in accordance with the setting of the OS. The AR image 760a is also applied with the language setting of the OS of the operator terminal 50 as the parameter, with which a message portion in the AR image 760a uses Japanese.

Similarly, in an example case of FIG. 30B, the second image capture screen 660b is used for the operator terminal 50 setting Chinese as the language based on the OS, and thereby a title region 663b and a message portion of the AR image 760b use Chinese. Similarly, in an example case of FIG. 30C, the second image capture screen 660c is used for the operator terminal 50 setting English as the language based on the OS, and thereby a title region 663c and a message portion of the AR image 760c use English.

As above described, when the second variant example of the first embodiment is applied to the example 1 that acquires the command URI from the external service web site 41, the parameter for designating the language is transferred between the image searching system 10, the operator terminal 50, the external service providing server 40, and the external service Web site 41. With this configuration, the operator terminal 50 can acquire the AR image corresponding to the language set by the OS installed in the operator terminal 50 from the client system 30.

Figure 31:
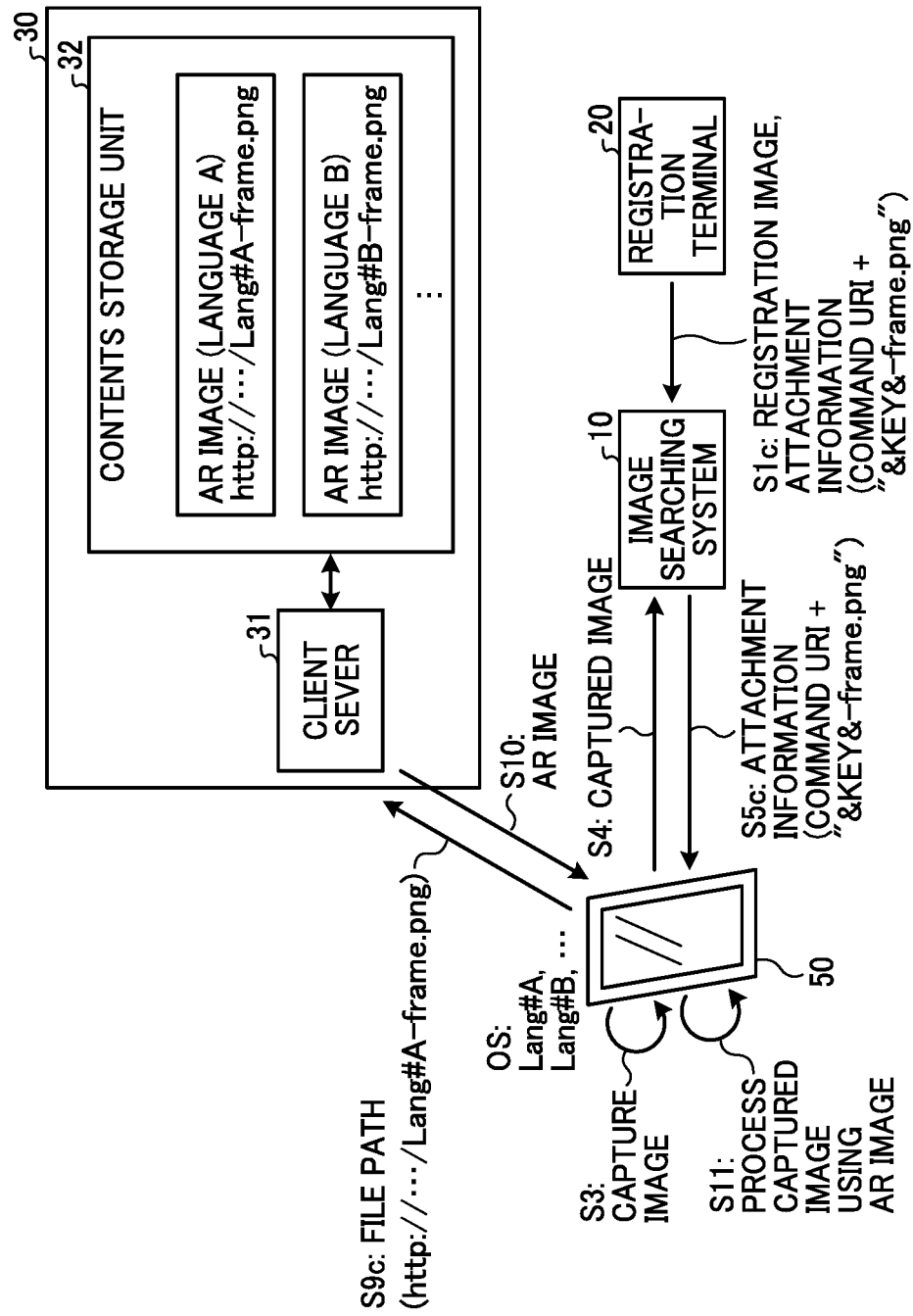
FIG. 31 illustrates a schematic diagram of processing that acquires a command URI directly from attachment information in the second variant example of the first embodiment.

Hereinafter, a description is given of applying the second variant example of the first embodiment to the above described example 2 of the first embodiment that acquires the command URI directly from the attachment information with reference to FIG. 31. In FIG. 31, the same reference numerals as those in FIGS. 7 and 14 are denoted by the same reference numerals, and detailed descriptions thereof will be omitted.

At first, the registration terminal 20 is used to register the registration image to be searched with respect to the captured image and the attachment information associated with the registration image in the image searching system 10 (step S1c). In step S1c, the file name of the AR image file of "&KEY&-frame.png" including the keyword of "KEY" in the language display part is added as a parameter to the URI included in the attachment information, wherein the URI is to be used for acquiring the AR image.

After completing the registration at the image searching system 10 in step S1c, the general user captures an image of the object 51 (e.g., actual object) using the operator terminal 50, and in step S4, the operator terminal 50 transmits a search request including the captured image for requesting an image searching based on the captured image to the image searching system 10.

Then, the image searching system 10 performs the image searching in response to the search request received from the operator terminal 50, and acquires the attachment information corresponding to the captured image included in the search request. The attachment information includes the URI of the external service web site 41 added with the file name of the AR image file of "&KEY&-frame.png" including the keyword of "KEY in the language display part as the parameter. The image searching system 10 returns the attachment information including the URI and the file name to the operator terminal 50 (step S5c).

In the operator terminal 50, the internal browser unit 512 analyzes the command URI acquired in step S5c using the received information processing unit 5121, and replaces the file name of "&KEY&-frame.png" included in the command URI with the identifier value of "Lang #A" indicating the language set by the OS installed in the operator terminal 50 to set the file name of "Lang #A-frame.png." Further, when an analysis result of the command URI indicates that the command URI includes the given text string of "clicker-ar," the received information processing unit 5121 uses the function calling unit 5122 to call the AR function unit 513. Then, the internal browser unit 512 transfers the URL including the file path of the AR image included in the query component of the command URI to the AR function unit 513. In this example case, the file path of the AR image includes the file name of "Lang #A-frame.png."

In the operator terminal 50, the AR function unit 513 uses the AR image acquiring unit 5130 to access the client system 30 in accordance with the URL including the file name of "Lang #A-frame.png" transferred from the internal browser unit 512 (step S9c).

In accordance with the file path, the AR image acquiring unit 5130 acquires the AR image including the language display part of "Lang #A" from the contents storage unit 32 via the client server 31 (step S10).

As above described, when the second variant example of the first embodiment is applied to the example 2 of the first embodiment that acquires the command URI directly from the attachment information, the parameter for designating the language is included in the command URI included in the attachment information. With this configuration, the operator terminal 50 can acquire the AR image corresponding to the language set by the OS installed in the operator terminal 50 from the client system 30.

Third Variant Example of First Embodiment

Hereinafter, a description is given of a third variant example of the first embodiment. The third variant example of the first embodiment is an example of applying a push notification configuration that actively or dynamically notifies a message to a user (e.g., general user) in the information processing system 1000 of the first embodiment. In the third variant example of the first embodiment, a notification server for performing the push notification is further connected to the network 1 illustrated in FIG. 1. Since the procedure that the operator terminal 50 acquires the AR image from the client system 30 in accordance with the command URI is substantially similar to the description of FIG. 7, the description of acquiring the AR image from the client system 30 is omitted.

The push notification is performed from the notification server to an apparatus (e.g., terminal device such as operator terminal 50) installed with an application program used for the push notification (hereinafter, push-implementing application). In this case, it is assumed that the search application installed in the operator terminal 50 includes a function of the push-implementing application (hereinafter, push-implementing application function). For example, a client customizes a search application provided by a service provider to incorporate the functionality of the push-implementing application into the search application.

The push-implementing application function can be used as follows. Specifically, when the push notification, implemented by the push-implementing application function installed in the operator terminal 50 is allowed (authorized) by a user operation, the operator terminal 50 transmits identification information identifying the push-implementing application to the notification server at a given timing, such as when the operator terminal 50 or the push-implementing application function are called, to request a notification identification (ID).

In response to the request, the notification server issues an apparatus-specific notification ID, stores the issued apparatus-specific notification ID, and transmits the apparatus-specific notification ID to the apparatus (e.g., operator terminal 50), which has requested the notification ID, together with the identification information of the push-implementing application function. The notification ID is identification information used by the notification server to identify the push notification application function that allows the push notification, and the apparatus installed with the push-implementing application function. For example, the notification ID is a device token if the operating system (OS) of the device or apparatus uses iOS (registered trademark). In the operator terminal 50, the push-implementing application function stores the acquired apparatus-specific notification ID in, for example, the storage 5004

For example, when the AR function unit 513 acquires the specific content (e.g. AR image) from the client system 30 in step S9 in response to the processing performed by the operator terminal 50 in step S3 in the sequence illustrated in FIG. 7 or FIG. 14, the push-implementing application function transmits the acquired notification ID to a provider of the push-implementing application, or the client system 30 that is used a provider that provides a message notifying the push to the push-implementing application. The client system 30 stores the notification ID transmitted from the operator terminal 50.

For example, if the client system 30 is configured to transmit the push notification to the operator terminal 50 that has acquired the AR image AR from the client system 30, the client system 30 transmits the notification ID corresponding to the operator terminal 50 and a message of push notification to the notification server, and requests the push notification to the notification server. The message can include a command URI for acquiring another specific content, such as another AR image, from the client system 30. In response to the request, the notification server transmits the notification ID and the message to the operator terminal 50 identified by the notification ID.

After the operator terminal 50 receives the notification ID and the message, the push-implementing application function corresponding to the notification ID is detected by the OS of the operator terminal 50, and then the message is displayed on the display of the operator terminal 50 with a given method using the detected push-implementing application function. If the received message includes the command URI, the push-implementing application function transfers the command URI included in the message, received with the notification ID, to the internal browser unit 512, and then the AR function unit 513 is called from the internal browser unit 512.

In the above described push notification, the notification ID is issued by the notification server in accordance with a user operation to the specific apparatus allowing the push notification to the push-implementing application function, and the message is transmitted to the specific apparatus using the push notification based on the notification ID. Therefore, by adopting the push notification function, the client system 30 can actively transmit the message to the operator terminal 50, which has acquired the specific content from the client system 30 using the AR function unit 513, without using user personal information such as an e-mail address.

Second Embodiment

Hereinafter, a description is given of a second embodiment with reference to FIGS. 32 and 33. In the above described first embodiment, the operator terminal 50 transmits the captured image to the image searching system 10, and receives the attachment information acquired by the image searching performed by the image searching system 10 based on the captured image, and then the operator terminal 50 acquires the specific content (e.g., AR image) from the client system 30 based on the attachment information. By contrast, in the second embodiment, the operator terminal 50 acquires the specific content (e.g., AR image) from the client system 30 via the external service providing server 40 without performing the image searching based on the captured image in the information processing system 1000.

Figure 32:
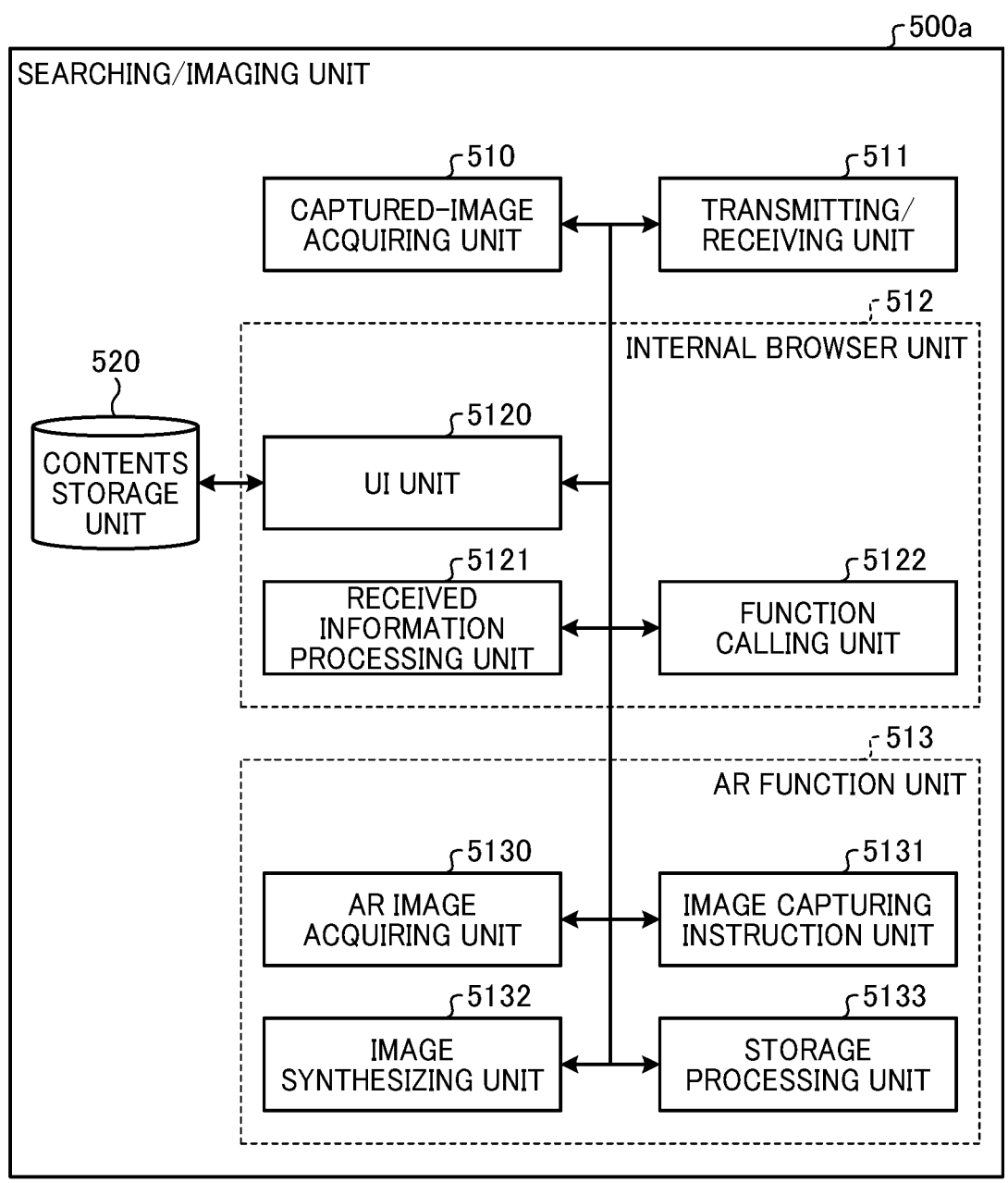
FIG. 32 illustrates an example of a functional block diagram of a searching/imaging unit in an operator terminal of a second embodiment.

FIG. 32 illustrates an example of a functional block diagram of a searching/imaging unit 500a in the operator terminal 50 of the second embodiment. In FIG. 32, the same reference numerals are assigned to portions that are common to those of FIG. 4, and detailed descriptions thereof will be omitted.

In FIG. 32, the searching/imaging unit 500a further includes a contents storage unit 520, different from the searching/imaging unit 500 of FIG. 4. The contents storage unit 520 stores display control information as internal contents, which is used for configuring a screen (e.g., screen image) including a link button indicating a link to a specific web site. The UI unit 5120 reads out the internal contents from the contents storage unit 520, generates the screen (e.g., screen image) based on the internal contents, and displays the screen.

Hereinafter, a description is given of an example of processing of the second embodiment with reference to FIG. 33.

Figure 33:
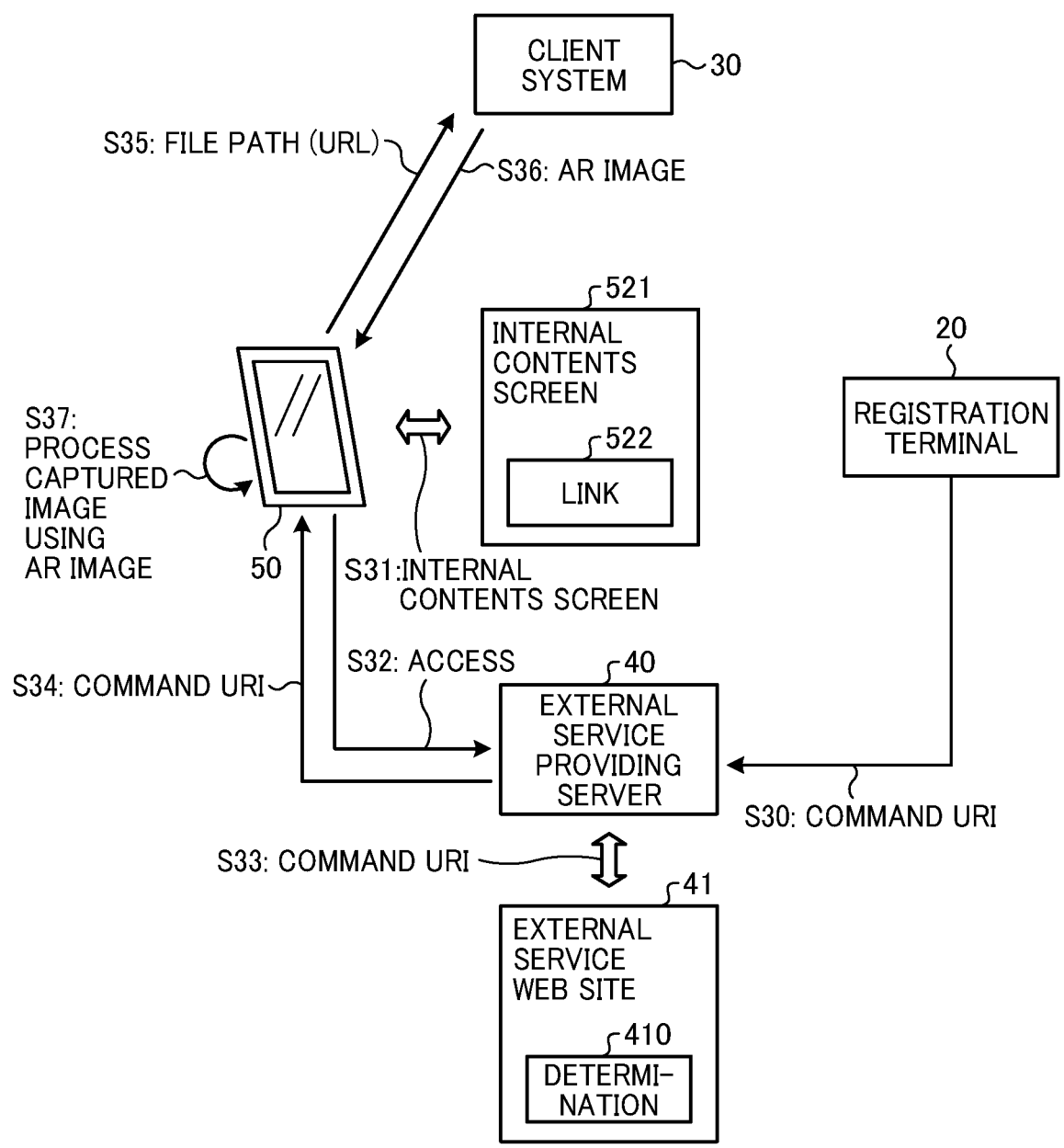
FIG. 33 illustrates a schematic diagram of processing of the second embodiment.

As illustrated in FIG. 33, at first, the registration terminal 20 or other terminal connected to the network 1 is used to transmit a command URI associated with the determination button 410 of the external service web site 41 to the external service providing server 40 (step S30).

Further, in the operator terminal 50, the UI unit 5120 reads out the internal contents from the contents storage unit 520 in response to, for example, a user operation, and displays an internal contents screen 521 using the internal contents (step S31). The internal contents screen 521 includes, for example, a link button 522 indicating a link to the external service web site 41.

In response to an operation to the link button 522, the operator terminal 50 accesses the external service web site 41 via the external service providing server 40 (steps S32 and 33). With this access, a screen (e.g., screen image) generated by the external service web site 41 is displayed on the display of the operator terminal 50.

In response to the operation to the determination button 410 disposed on the external service web site 41, the command URI associated with the determination button 410 is transmitted to the operator terminal 50 (step S34).

In the operator terminal 50, the internal browser unit 512 uses the received information processing unit 5121 to analyze the command URI that is acquired in response to the operation to the determination button 410 disposed on the external service web site 41. If an analysis result of the command URI indicates that the command URI includes the given text string of "clicker-ar," the received information processing unit 5121 uses the function calling unit 5122 to call the AR function unit 513. Then, the internal browser unit 512 transfers the URL including the file path of the AR image included in the query component of the command URI to the AR function unit 513.

In the operator terminal 50, the AR function unit 513 uses the AR image acquiring unit 5130 to access the client system 30 based on the URL transferred from the internal browser unit 512 (step S35).

The AR image acquiring unit 5130 acquires an AR image from the contents storage unit 32 via the client server 31 in accordance with the file path included in the URL (step S36).

The image capturing instruction unit 5131 of the AR function unit 513 performs an image processing using the AR image that is acquired in response to the user operation to the operator terminal 50 (step S37).

As to the above described second embodiment, the operator terminal 50 can acquire the command URI from the external service web site 41 using the link 522, included in the internal contents screen 521 stored in the operator terminal 50 and associated with the external service web site 41, and the AR function unit 513 is called using the acquired command URI to acquire the AR image from the client system 30. Since the internal contents screen 521 is used, the operator terminal 50 can access not only the external service web site 41 but also other services to implement various services.

As to the above described embodiments, the cooperation between different systems can be configured flexibly.

Although the description of the present invention has been made based on the embodiments described above, the present invention is not limited to the requirements described in the above embodiments. Numerous additional modifications and variations are possible in light of the above teachings. It is therefore to be understood that, within the scope of the appended claims, the disclosure of this patent specification may be practiced otherwise than as specifically described herein.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:
1. An information processing system, comprising:
an operator terminal configured to transmit an image, captured by an image capture device, as a captured image; and
an image searching system connected with the operator terminal via a network, the image searching system including:
a first memory to store a registration image of a registration object and attachment information associated with the registration image; and
first circuitry configured to:
receive the captured image from the operator terminal;
search the attachment information associated with the registration image based on an image of an object detected in the captured image; and
transmit the attachment information to the operator terminal, the attachment information including first link information of an external service and second link information that includes a command designating a specific operation, wherein
the operator terminal includes second circuitry configured to:
acquire the captured image captured by the image capture device;
transmit the captured image to the image searching system;

receive the attachment information from the image searching system as a response to transmission of the captured image;

control a display to display a user interface screen superimposed on the captured image, the user interface screen including a plurality of user-selectable icons, each respective user-selectable icon corresponding to a different one of the first and second link information included in the attachment information;

receive a designation operation, by a user, of an icon displayed in the user interface screen, wherein the designation operation designates which one of the first link information and the second link information is to be executed;

determine, based on the designation operation, which particular link information of the first link information and the second link information was designated;

execute, in response to determining that the particular link information designated was the second link information, a second application that calls a first application, the first application acquiring a specific content from a storage location on the network in accordance with the attachment information and performing the specific operation using the specific content; and execute, in response to determining that the particular link information designated was the first link information, the second application to access content of a link destination of the external service, the link destination being included in the attachment information.

2. The information processing system of claim 1, wherein the second circuitry is further configured to execute the first application to acquire the specific content in accordance with a specific uniform resource identifier (URI) included in the received attachment information, and the second circuitry is further configured to control an imaging process using the acquired specific content to generate a synthesized image based on the acquired specific content and the captured image.

3. The information processing system of claim 2, wherein the second circuitry is further configured to store the synthesized image in a second memory disposed in the operator terminal, and transmit the synthesized image to at least one social networking service (SNS), selected from one or more social networking services (SNSs) accessible from the operator terminal.

4. The information processing system of claim 2, wherein the second circuitry is further configured to execute the second application to acquire the specific URI from the link destination included in the attachment information.

5. The information processing system of claim 4, further comprising:

a web site to perform a redirect to the specific URI including a predetermined command, wherein the second circuitry is further configured to execute the second application to acquire the specific URI including the predetermined command from the link destination via the web site.

6. The information processing system of claim 2, wherein the second circuitry is further configured to execute the second application to acquire the specific URI included in the attachment information.

7. The information processing system of claim 2, wherein in a case that the received attachment information includes an identifier designating a specific language, the second circuitry is further configured to set information of the specific language in the acquired specific URI to apply the specific language for the operator terminal.

8. The information processing system of claim 2, wherein a predetermined command is included as a scheme of the specific URI.

9. The information processing system of claim 2, wherein the second circuitry is further configured to execute one or more programs distributed by the image searching system to execute the first application and the second application at the operator terminal, and the specific URI is provided from a client system managed by a client of the image searching system.

10. The information processing system of claim 1, wherein the second circuitry is further configured to allow calling of the first application from the second application, while not allowing the calling of the first application from other applications.

11. A method of processing information using an operator terminal, the method comprising:

acquiring an image, captured using an image capture device, as a captured image at the operator terminal;

transmitting the captured image to an image searching system connected with the operator terminal via a network, the image searching system including a memory storing a registration image of a registration object and attachment information associated with the registration image, and the image searching system is configured to search the attachment information corresponding to an image of an object detected in the captured image from the memory and transmit the attachment information to the operator terminal;

receiving the attachment information from the image searching system as a response to transmission of the captured image to the image searching system, the attachment information including first link information of an external service and second link information that includes a command designating a specific operation;

controlling a display to display a user interface screen superimposed on the captured image, the user interface screen including a plurality of user-selectable icons, each respective user-selectable icon corresponding to a different one of the first and second link information included in the attachment information;

receiving a designation operation, by a user, of an icon displayed in the user interface screen, wherein the designation operation designates which one of the first link information and the second link information is to be executed;

determining, based on the designation operation, which particular link information of the first link information and the second link information was designated;

executing, in response to determining that the particular link information designated was the second link information, a second application that calls a first application, the first application acquiring a specific content from a storage location on the network in accordance with the attachment information and performing the specific operation using the specific content; and executing, in response to determining that the particular link information designated was the first link information, the second application to access content of a link destination of the external service, the link destination being included in the attachment information.

12. An operator terminal, comprising: processing circuitry configured to acquire an image, captured using an image capture device, as a captured image;

transmit the captured image to an image searching system connected with the operator terminal via a network, the image searching system including a memory storing a registration image of a registration object and attachment information associated with the registration image, and the image searching system is configured to search the attachment information corresponding to an image of an object detected in the captured image from the memory and transmit the attachment information to the operator terminal;

receive the attachment information from the image searching system as a response to transmission of the captured image to the image searching system, the attachment information including first link information of an external service and second link information that includes a command designating a specific operation;

control a display to display a user interface screen superimposed on the captured image, the user interface screen including a plurality of user-selectable icons, each respective user-selectable icon corresponding to a different one of the first and second link information included in the attachment information;

receive a designation operation, by a user, of an icon displayed in the user interface screen, wherein the designation operation designates which one of the first link information and the second link information is to be executed;

determine, based on the designation operation, which particular link Information of the first link information and the second link information was designated;

execute, in response to determining that the particular link information designated was the second link information, a second application that calls a first application, the first application acquiring a specific content from a storage location on the network in accordance with the attachment information and performing the specific operation using the specific content; and execute, in response to determining that the particular link information designated was the first link information, the second application to access content of a link destination of the external service; the link destination being included in the attachment information.

* * * * *